United States Patent
Homma et al.

(10) Patent No.: US 8,307,140 B2
(45) Date of Patent: Nov. 6, 2012

(54) CONTENT RECEPTION APPARATUS AND CONTENT RECEPTION METHOD

(75) Inventors: Tsuyoshi Homma, Chiba (JP); Takashi Kanao, Tokyo (JP); Hiroyuki Chiba, Kanagawa (JP); Hirofumi Kouda, Saitama (JP); Akihiko Kinoshita, Tokyo (JP)

(73) Assignee: Sony Corporation (JP)

( * ) Notice: Subject to any disclaimer, the term of this patent is extended or adjusted under 35 U.S.C. 154(b) by 452 days.

(21) Appl. No.: 12/590,798

(22) Filed: Nov. 13, 2009

(65) Prior Publication Data

US 2010/0131690 A1   May 27, 2010

(30) Foreign Application Priority Data

Nov. 27, 2008 (JP) ................. P2008-302887

(51) Int. Cl.
*G06F 12/00* (2006.01)

(52) U.S. Cl. .................. 710/241; 370/230; 710/200

(58) Field of Classification Search .......... 710/240–244, 710/260, 200; 370/230; 709/223
See application file for complete search history.

(56) References Cited

U.S. PATENT DOCUMENTS

| 6,118,762 A * | 9/2000 | Nomura et al. ............ 370/230 |
| 2008/0025306 A1 | 1/2008 | Kamura |
| 2008/0152031 A1* | 6/2008 | Lee et al. ............ 375/260 |

FOREIGN PATENT DOCUMENTS

JP   2008-035401 A   2/2008

* cited by examiner

*Primary Examiner* — Brian Misiura
*Assistant Examiner* — Kim Huynh
(74) *Attorney, Agent, or Firm* — Lerner, David, Littenberg, Krumholz & Mentlik, LLP

(57) ABSTRACT

Disclosed is a content reception apparatus capable of receiving a content distributed from a server apparatus via a first network and a second network, the content reception apparatus including a plurality of content reception apparatuses capable of being connected to the second network that is local and connected to the first network, the server apparatus being capable of distributing a content and capable of being connected to the first network. The content reception apparatus includes an arbitration condition storage unit to store an arbitration condition for an arbitration, an arbitration table storage unit to store an arbitration table, an input unit with which a content reception request is input, an arbitration start request transmission unit to generate and transmit an arbitration start request, and an arbitration unit to execute arbitration processings.

9 Claims, 19 Drawing Sheets

Arbitration table

| Apparatus ID | Priority order of apparatus | Content ID | Content priority | Use band (Mbit/s) | Utilization time period (sec) |
|---|---|---|---|---|---|
| | | | | | |
| | | | | | |
| | | | | | |

FIG.4

Arbitration table

| Apparatus ID | Priority order of apparatus | Content ID | Content priority | Use band (Mbit/s) | Utilization time period (sec) |
|---|---|---|---|---|---|
| B | 2 | abcd123 | 3 | 1.3 | 60 |
| C | 1 | efgh456 | 1 | 1.5 | - |
| | | | | | |
| | | | | | |

FIG.8

Information on content reception included in arbitration start request

| Apparatus ID | Priority order of apparatus | Content ID | Content priority | Use band (Mbit/s) | Utilization time period (sec) |
|---|---|---|---|---|---|
| A | 3 | ijkl7890 | 2 | 1.4 | 60 |

FIG.9

Arbitration table

| Apparatus ID | Priority order of apparatus | Content ID | Content priority | Use band (Mbit/s) | Utilization time period (sec) |
|---|---|---|---|---|---|
| C | 1 | efgh456 | 1 | 1.5 | - |
|  |  |  |  |  |  |
|  |  |  |  |  |  |
|  |  |  |  |  |  |

FIG.10

Arbitration table

| Apparatus ID | Priority order of apparatus | Content ID | Content priority | Use band (Mbit/s) | Utilization time period (sec) |
|---|---|---|---|---|---|
| C | 1 | efgh456 | 1 | 1.5 | - |
| A | 3 | ijkl7890 | 2 | 1.4 | 60 |
|  |  |  |  |  |  |
|  |  |  |  |  |  |

FIG.11

Information on content reception included in arbitration start request

| Apparatus ID | Priority order of apparatus | Content ID | Content priority | Use band (Mbit/s) | Utilization time period (sec) |
|---|---|---|---|---|---|
| A | 3 | ijkl7890 | 3 | 1.4 | 60 |

FIG.12

Arbitration table

| Apparatus ID | Priority order of apparatus | Content ID | Content priority | Use band (Mbit/s) | Utilization time period (sec) | Valid flag |
|---|---|---|---|---|---|---|
| B | 2 | abcd123 | 3 | 1.3 | 60 | OFF |
| C | 1 | efgh456 | 1 | 1.5 | – | ON |
| A | 3 | ijkl7890 | 2 | 1.4 | 60 | ON |
| | | | | | | |

FIG.13

Arbitration table

| Apparatus ID | Priority order of apparatus | Content ID | Content priority | Use band (Mbit/s) | Utilization time period (sec) | Valid flag | Kind of content | Distribution method |
|---|---|---|---|---|---|---|---|---|
| B | 2 | abcd123 | 3 | 1.3 | 60 | OFF | Moving image | Multicast |
| C | 1 | efgh456 | 1 | 1.5 | – | ON | Program | Multicast |
| A | 3 | ijkl7890 | 2 | 1.4 | 60 | ON | Moving image | Unicast |
| | | | | | | | | |

FIG.20

CONTENT RECEPTION APPARATUS AND CONTENT RECEPTION METHOD

CROSS-REFERENCE TO RELATED APPLICATION

The present application claims priority from Japanese Patent Application No. JP 2008-302887 filed in the Japanese Patent Office on Nov. 27, 2008, the entire content of which is incorporated herein by reference.

BACKGROUND OF THE INVENTION

1. Field of the Invention

The present invention relates to a content reception apparatus and a content reception method for receiving a content distributed via a network.

2. Description of the Related Art

In recent years, various content distribution systems have been provided. For example, there are distribution systems that use airwaves as transmission media, such as a terrestrial analog broadcasting, a terrestrial digital broadcasting, and BS and CS broadcastings, and distribution systems that use networks as transmission media, such as a unicast method and an IP multicast method.

The unicast method refers to a system of delivering packets to an apparatus upon request by specifying an IP address of the apparatus. A VOD (video on demand) system belongs to the unicast method. Further, the VOD system includes a stream system of distributing a content as a real-time stream, a download system of distributing a content as a file of a general-purpose file system, and the like.

The IP multicast method refers to a system in which packets delivered from a server as a content distribution source to a multicast group are relayed by a router, and the packets are routed to IP addresses of clients which are associated with the multicast group and registered.

SUMMARY OF THE INVENTION

The following problems have arisen in a local system at home due to, for example, a limitation on an available network band. For example, when a content for which a band has to be guaranteed like a content distributed by a multicast method is tried to be newly viewed, in a case where there is no free band because a band is used for receiving a preceding content, it is necessary to wait until viewing of the preceding content is over.

Further, generally, a band is used in order of contents which are requested to be viewed. Accordingly, it has been difficult to reasonably use a band in accordance with importance of contents or a priority order among apparatuses. For example, in a case where an important content is desired to be viewed with the highest-priority apparatus of a user, it is desirable to use the band for most preferentially receiving the important content regardless of a use condition of the current band.

In view of the above-mentioned circumstances, it is desirable to provide a content reception apparatus and a content reception method that are capable of efficiently using a band of a local network in a priority order in accordance with a preset arbitration condition for receiving a plurality of contents by content reception apparatuses.

According to an embodiment of the present invention, there is provided a content reception apparatus capable of receiving a content distributed from a server apparatus via a first network and a second network. The content reception apparatus includes a plurality of content reception apparatuses capable of being connected to the second network that is local and connected to the first network. The server apparatus is capable of distributing a content and capable of being connected to the first network. The content reception apparatus includes an arbitration condition storage unit, an arbitration table storage unit, an input unit, an arbitration start request transmission unit, and an arbitration unit. The arbitration condition storage unit stores an arbitration condition for an arbitration for using a band of the second network by the plurality of content reception apparatuses. The arbitration table storage unit stores an arbitration table in which information on a reception of the content in execution by the plurality of content reception apparatuses connected to the second network is registered. With the input unit, a content reception request including identification information of a content to be received and a priority of the content is input by a user. The arbitration start request transmission unit generates an arbitration start request including at least the identification information of the content and the priority of the content that are included in the content reception request input with the input unit, a use band used when the content is received, and apparatus identification information predetermined for the content reception apparatus itself, and transmits the arbitration start request to other content reception apparatuses via the second network. The arbitration unit compares, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network to judge whether a residual band necessary for executing the content reception of the arbitration start request remains, additionally registers, when the necessary residual band remains, information items included in the arbitration start request in the arbitration table to transmit a response including details of the arbitration table updated to the content reception apparatus as an arbitration start request source, determines, when the necessary residual band is insufficient, a lowest-priority content reception in the content receptions in execution that are registered in the arbitration table and the content reception of the arbitration start request in accordance with the arbitration condition stored in the arbitration condition storage unit, stops, when the lowest-priority content reception is executed by the content reception apparatus itself, the content reception to delete information on the content reception stopped from the arbitration table and transmit a response including details of the arbitration table updated to the content reception apparatus as the arbitration start request source, transmits, when the lowest-priority content reception is executed by the content reception apparatus as the arbitration start request source, a response including details of the arbitration table at a time when the arbitration start request is received to the content reception apparatus as the arbitration start request source, deletes, when the lowest-priority content reception is executed by a content reception apparatus other than the content reception apparatus itself and the content reception apparatus as the arbitration start request source, the information on the content reception from the arbitration table to transmit a response including details of the arbitration table updated to the content reception apparatus as the arbitration start request source, and judges, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

In this embodiment, the band of the local network can be efficiently used for a plurality of content receptions by the content reception apparatuses in the priority order in accordance with the preset arbitration condition.

In the content reception apparatus according to this embodiment, the arbitration unit may cause the user to set the arbitration condition and a priority order of an apparatus of the content reception apparatus itself, and transmit the arbitration condition and the priority order of the apparatus that are set to the other content reception apparatuses via the second network to share and store the arbitration condition and the priority order of the apparatus among the plurality of content reception apparatuses connected to the second network. The user can set the arbitration condition, which can improve the convenience for the user.

The arbitration unit may cause the user to set, as the arbitration condition, at least one of preferentially executing a content reception for the apparatus having higher priority, preferentially executing a content reception of the content having higher priority, and preferentially executing a content reception in which the use band is smaller.

According to another embodiment of the present invention, there is provided a content reception apparatus capable of receiving a content distributed from a server apparatus via a first network and a second network. The content reception apparatus includes a plurality of content reception apparatuses capable of being connected to the second network that is local and connected to the first network. The server apparatus is capable of distributing a content and capable of being connected to the first network. The content reception apparatus includes an arbitration condition storage unit, an arbitration table storage unit, an input unit, an arbitration start request transmission unit, and an arbitration unit. The arbitration condition storage unit stores an arbitration condition for an arbitration for using a band of the second network by the plurality of content reception apparatuses. The arbitration table storage unit stores an arbitration table in which information on a reception of the content in execution by the plurality of content reception apparatuses connected to the second network and flag information that indicates whether the information on the content reception is valid are registered. With the input unit, a content reception request including identification information of a content to be received and a priority of the content is input by a user. The arbitration start request transmission unit generates an arbitration start request including at least the identification information of the content and the priority of the content that are included in the content reception request input with the input unit, a use band used when the content is received, and apparatus identification information predetermined for the content reception apparatus itself, and transmits the arbitration start request to other content reception apparatuses via the second network. The arbitration unit compares, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network to judge whether a residual band necessary for executing the content reception of the arbitration start request remains, additionally registers, when the necessary residual band remains, information items included in the arbitration start request in the arbitration table to transmit a response including details of the arbitration table updated to the content reception apparatus as an arbitration start request source, determines, when the necessary residual band is insufficient, a lowest-priority content reception in the content receptions in execution that are registered in the arbitration table and the content reception of the arbitration start request in accordance with the arbitration condition stored in the arbitration condition storage unit, stops, when the lowest-priority content reception is executed by the content reception apparatus itself, the content reception to set the flag information that indicates the information on the content reception stopped that is registered in the arbitration table is invalid and transmit a response including details of the arbitration table updated to the content reception apparatus as the arbitration start request source, transmits, when the lowest-priority content reception is executed by the content reception apparatus as the arbitration start request source, a response including details of the arbitration table at a time when the arbitration start request is received to the content reception apparatus as the arbitration start request source, sets, when the lowest-priority content reception is executed by a content reception apparatus other than the content reception apparatus itself and the content reception apparatus as the arbitration start request source, the flag information that indicates the information on the content reception in the arbitration table is invalid to transmit a response including details of the arbitration table updated to the content reception apparatus as the arbitration start request source, and judges, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

In this embodiment, the band of the local network can be efficiently used for a plurality of content receptions by the plurality of content reception apparatuses in the priority order in accordance with the preset arbitration condition. In addition, in a case of a content distributed by a unicast method such as the VOD, even when the reception is temporarily stopped, the content data already obtained is left as it is and the reception of the rest content data can be restarted when a residual band for the content reception is generated.

In the content reception apparatus according to this embodiment, the arbitration unit may delete, upon completion of a reception of one content, information on the content from the arbitration table of the arbitration table storage unit, determine a highest-priority content reception from among content receptions without valid flag information in accordance with the arbitration condition, judge whether a residual band necessary for executing the content reception remains, update, when the necessary residual band remains, the arbitration table so that the flag information is set to be valid with respect to the content reception to transmit a response including details of the arbitration table updated to other content reception apparatuses, compare, upon reception of the response from the other content reception apparatuses, details of the arbitration table included in the response with those of the arbitration table of the arbitration table storage unit, start, when information on the content reception in a stopped state which is executed by the content reception apparatus itself is included in the details of the arbitration table included in the response, the content reception, and update the details of the arbitration table of the arbitration table storage unit to the details of the arbitration table included in the response.

Further, when the highest-priority content reception determined in accordance with the arbitration condition is executed by the content reception apparatus itself and the residual band necessary for executing the content reception remains, the arbitration unit may perform control so that the content reception is started. As a result, it is possible to automatically restart the content reception stopped when the residual band for the content reception is generated.

As described above, according to the embodiments of the present invention, the band of the local network can be efficiently used for the plurality of the content receptions by the content reception apparatuses in the priority order in accordance with the preset arbitration condition, with the result that the convenience for the user can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a diagram showing a structure of an arbitration table;

FIG. 8 is a diagram showing an example of an arbitration table;

FIG. 9 is a diagram showing an example of information on a content reception included in an arbitration start request;

FIG. 10 is a diagram showing an example of the arbitration table after the content reception is stopped;

FIG. 11 is a diagram showing an example of the arbitration table to which the information on the content reception included in the arbitration start request is added;

FIG. 12 is a diagram showing another example of the information on the content reception included in the arbitration start request;

FIG. 13 is a diagram showing a structure of the arbitration table to which a valid flag is added;

FIG. 20 is a diagram showing a structure of an arbitration table according to a third embodiment.

DESCRIPTION OF PREFERRED EMBODIMENTS

Hereinafter, embodiments of the present invention will be described with reference to the drawings.

First Embodiment

Figure 1:
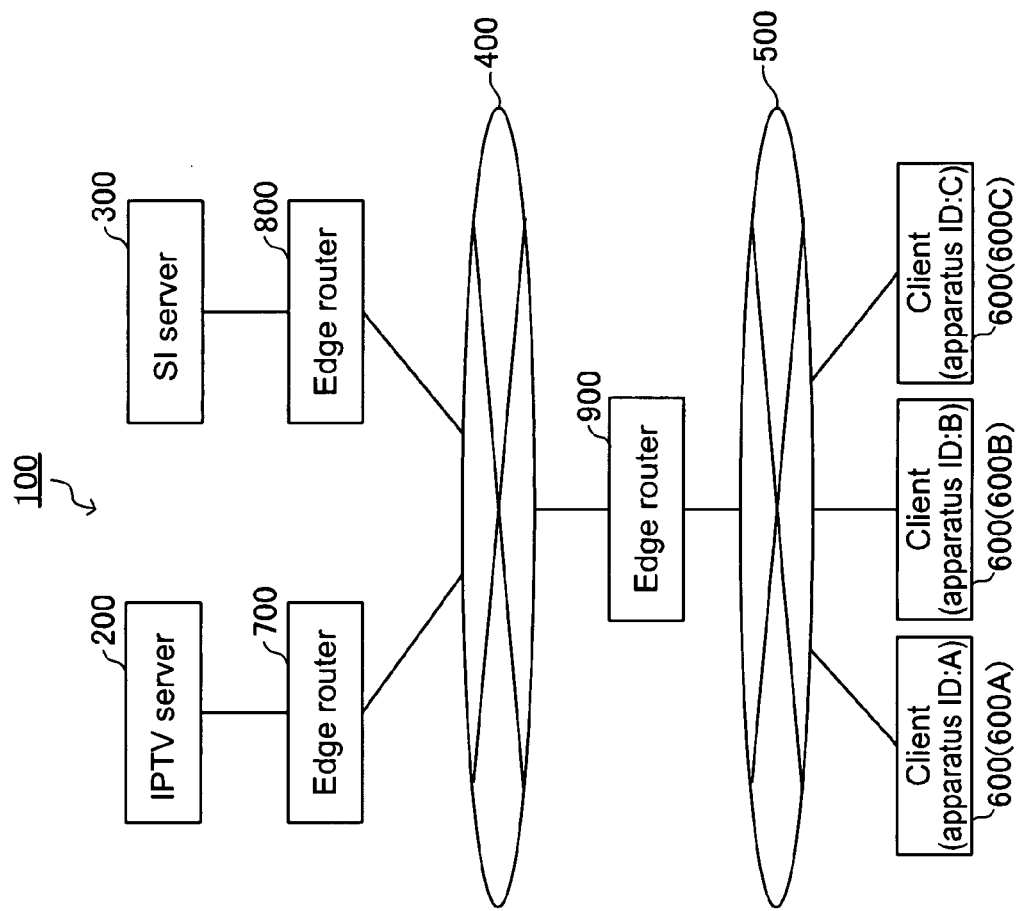
FIG. 1 is a diagram showing a structure of a content transmission/reception system according to a first embodiment of the present invention.

FIG. 1 is a diagram showing a structure of a content transmission/reception system 100 according to a first embodiment of the present invention.

The content transmission/reception system 100 includes an IPTV server 200, an SI server 300, a global network 400 such as the Internet, a local area network 500 (hereinafter, referred to as "LAN 500") such as a home network, and a plurality of clients 600 serving as content reception apparatuses. The IPTV server 200 and the SI server 300 can be connected to the global network 400 through edge routers 700 and 800, respectively. A plurality of IPTV servers 200 may be connected to the global network 400. The global network 400 and the LAN 500 are connected to each other through an edge router 900. To the LAN 500, a plurality of clients 600 can be connected. Herein, let us assume that three clients 600 can be connected. The three clients may be referred to as a "first client 600A", a "second client 600B", and a "third client 600C", respectively, when separately described.

The IPTV server 200 distributes various contents such as a moving image, music, and software via a network. Herein, an IPTV (internet protocol television) is a collective term of services of delivering digital television broadcasts by using IPs or broadcasting techniques therefor. The IPTV server can distribute contents by various systems such as a unicast method and an IP multicast method.

The client 600 can receive a stream of a content distributed by the IPTV server 200 and store it in a recording medium, and can decode the stream of the content stored and reproduce it in order to view the content. Specifically, the client 600 is a video recording apparatus, a PC, or a television having a video recording function, for example. In short, any apparatuses capable of receiving data of a content via a network, storing the data, or reproducing the data can be used as the client 600.

Figure 2:
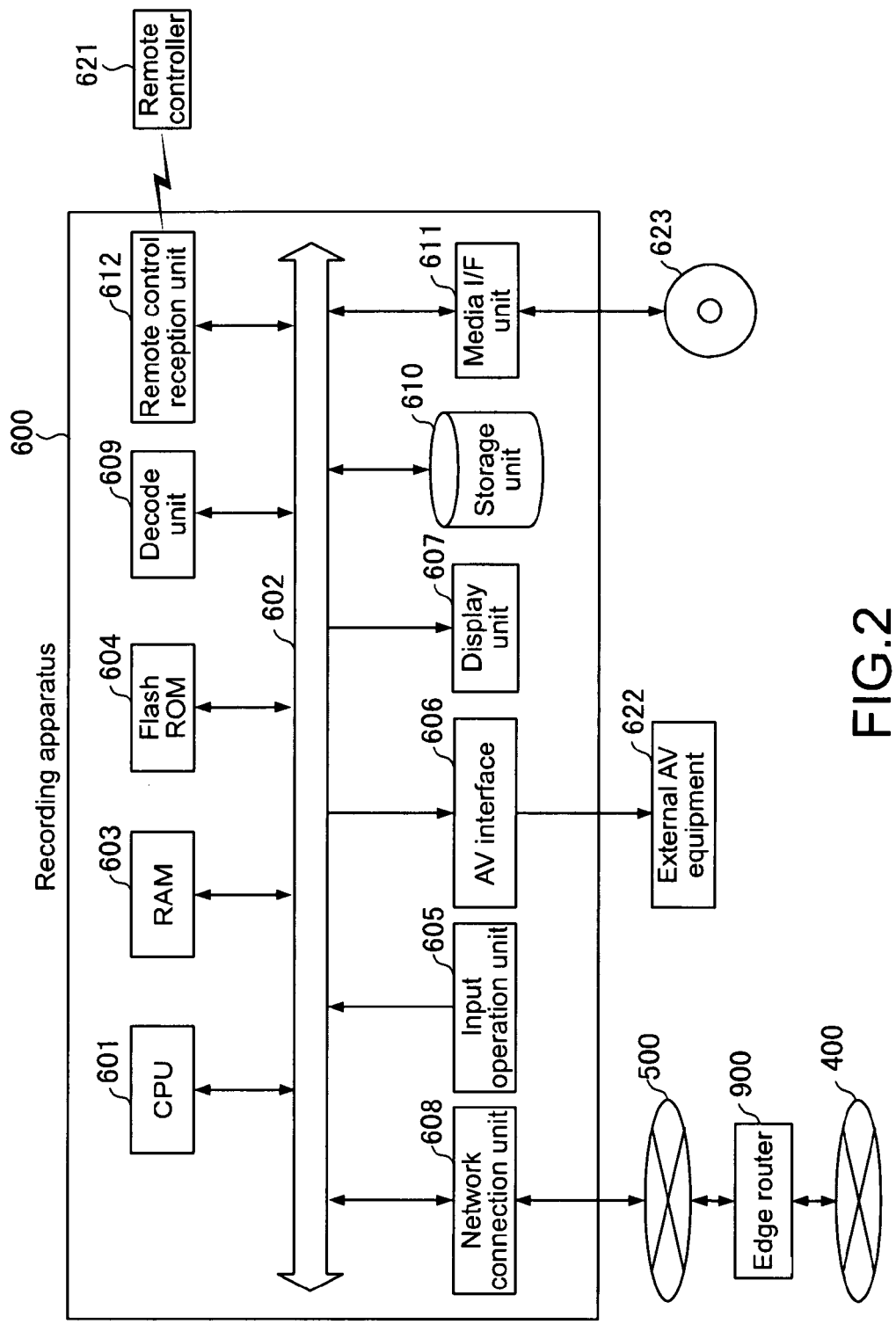
FIG. 2 is a diagram showing a hardware structure of a client.

FIG. 2 is a diagram showing a hardware structure of the client 600. Here, FIG. 2 shows a case where the client 600 is a video recording apparatus.

As shown in FIG. 2, a RAM 603, a flash ROM 604, an input operation unit 605, an AV interface unit 606, a display unit 607, a network connection unit 608, a decode unit 609, a storage unit 610 constituted of a hard disk drive (HDD) and the like, a media interface unit 611, a remote control reception unit 612, and the like are connected to a CPU 601 via a system bus 602.

The RAM 603 is used as an area for temporarily storing data and a temporal work area for the CPU 601.

The flash ROM 604 stores software such as various data and programs to be processed and executed by the CPU 601. The software stored in the flash ROM 604 can be updated.

The input operation unit 605 includes various keys and the like, and processes inputs of commands for various operations from a user. The command input from the input operation unit 605 is transmitted to the CPU 601 through the system bus 602.

The remote control reception unit 612 serves as an interface through which communication is performed with a remote controller 621. The remote controller 621 includes various keys like the input operation unit 605. The remote controller 621 processes inputs of the commands for various operations from the user, converts the inputs into optical signals, and transmits the optical signals. The remote control reception unit 612 receives the optical signals transmitted from the remote controller 621, converts the signals into electrical signals, and outputs the electrical signals to the CPU 601 through the system bus 602.

The display unit 607 is constituted of, for example, a display such as an LCD (liquid crystal display) and a display control circuit that drives the display and confirms data or a command input by the user or displays various statuses, for example.

The network connection unit 608 serves as an interface that performs processings for connection with the network such as the LAN 500.

The AV interface unit 606 processes an input/output of a video signal and an audio signal with external AV equipment 622 such as a television.

The decode unit 609 decodes data of a program that has been subjected to compression coding for transmission and recording. Video data, audio data, or the like decoded by the decode unit 609 is output to the external AV equipment 622 such as the television through the AV interface unit 606.

The storage unit 610 is an HDD, for example. In the storage unit 610, content data distributed from the IPTV server 200, SI information distributed from the SI server 300, and the like are stored.

The media interface unit 611 is an interface capable of recording and reproducing content data with respect to a removable medium 623 such as a DVD (digital versatile disc) and a Blu-ray Disc.

The above is the description on the hardware structure of the client 600.

The content transmission/reception system 100 according to this embodiment is a system based on an NGN (next generation network). In the NGN, an end-to-end band guarantee function is supported. For example, in a case where a client requests the IPTV server to distribute a content, a band for transmitting the content in a transmission system between nodes of the client and the IPTV server is guaranteed by the band guarantee function.

However, as in this embodiment, in an environment in which the LAN 500 to which the plurality of clients 600 are connected is connected to the global network 400 whose band is guaranteed through the edge router 900, the following problem is caused. That is, in a case where a physical bandwidth of the LAN 500 is smaller than a bandwidth that can be used in the band-guaranteed global network 400, when the bandwidth of the LAN 500 for transmitting the preceding content is consumed, a residual bandwidth necessary for the transmission of a content that is subsequently requested is lacked. As a result, an error may be caused in the content transmission, or it is necessary to get into a standby state. For this reason, in order to receive a content that the user wants to view anyway, the user has to operate to cut a session for the reception of a content in execution and release the band.

In this embodiment, by equipping each of the clients 600 with an arbitration function among the clients 600, which relates to the use of the band of the LAN 500, the above problem is overcome.

Figure 3:
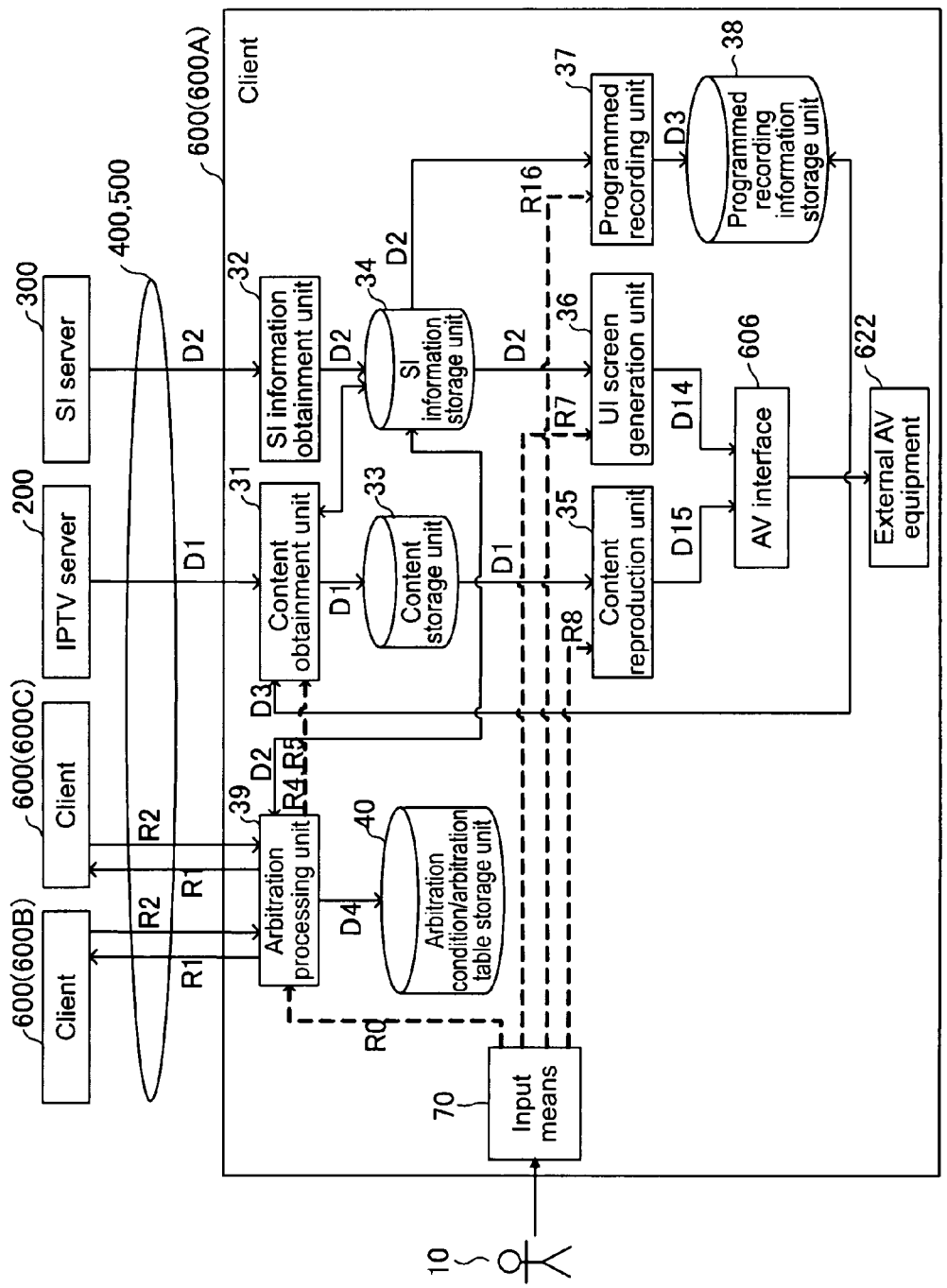
FIG. 3 is a diagram showing a functional structure of the client.

Next, a description will be given on a functional structure of the client 600 having the arbitration function. FIG. 3 is a diagram showing the functional structure of the client 600.

As shown in FIG. 3, the client 600 includes a content obtainment unit 31, an SI information obtainment unit 32, a content storage unit 33, an SI information storage unit 34, a content reproduction unit 35, a UI screen generation unit 36, a programmed recording unit 37, a programmed recording information storage unit 38, an arbitration processing unit 39, an arbitration condition/arbitration table storage unit 40, and the like.

The content obtainment unit 31 obtains data D1 of a content distributed by the unicast method or the multicast method from the IPTV server 200, and stores the data D1 in the content storage unit 33.

The SI information obtainment unit 32 obtains SI information D2 distributed from the SI server 300, and stores the SI information D2 in the SI information storage unit 34. The SI (service information) information includes information on the content to be distributed, such as a content ID, a title, a genre, a performer, a distribution time period (in the case of multicast method, time at which a broadcast starts and ends), a streaming capacity (in the case of the multicast method, a transmission rate), address information of an access destination of the content (in the case of the multicast method, a multicast address), and the like.

The UI screen generation unit 36 reads the SI information D2 stored in the SI information storage unit 34 in accordance with a content guide display request R7 that is input by the user by using an input means 70 such as the input operation unit 605 and the remote controller 621. Based on the SI information D2, the UI screen generation unit 36 creates a content guide D14 as a list of the contents distributed from the IPTV server 200, and through the AV interface unit 606, performs a processing to cause the external AV equipment 622 to display the content guide D14.

The user can select a content for which the user wants to conduct programmed recording or a content that the user wants to view by using the input operation unit 605 and the remote controller 621 while also seeing the content guide D14 displayed on the external AV equipment 622.

The programmed recording unit 37 performs a processing of programmed recording of the content in response to a content programmed recording request R16 that is input by the user by using the input means 70. That is, the programmed recording unit 37 extracts, as programmed recording data D3, information such as a multicast address and a broadcasting time period (dates and times when the broadcast starts/ends) which is necessary for programmed recording of the content from the SI information D2, and registers the programmed recording data D3 in the programmed recording information storage unit 38.

The content obtainment unit 31 requests to obtain the data D1 of the content based on the programmed recording data D3 registered in the programmed recording information storage unit 38, and stores the data D1 thus obtained in the content storage unit 33. The content obtainment unit 31 transmits, to the edge router 900, a message requesting to take part in a multicast group corresponding to the content or transmits a message requesting to establish a session for receiving the content with the IPTV server 200, for example, thereby obtaining the content data D1.

The content reproduction unit 35 reads the data D1 of the content from the content storage unit 33 in response to a content reproduction request R8 or the like that is input by the user by using, e.g., the input means 70, and decodes the data D1 by the decode unit 609. The content reproduction unit 35 outputs video/audio reproduction data D15 obtained by the decoding operation to the external AV equipment 622 through the AV interface unit 606.

The arbitration processing unit 39 performs an arbitration processing for using the band of the LAN 500 at a time when the content is received by the plurality of clients 600. The arbitration processing is performed by using an arbitration table stored in the arbitration condition/arbitration table storage unit 40.

FIG. 4 is a diagram showing a structure of an arbitration table stored in the arbitration condition/arbitration table storage unit 40. The arbitration table is used for sharing information on content reception in execution in the clients 600. In the arbitration table, a content common to the clients 600 is stored. In the arbitration table, as information on the content reception in execution, an apparatus ID, a priority order of apparatuses, a content ID, a priority of contents, a use band, a utilization time period, and the like are registered.

The apparatus ID is information for identifying clients 600 that are executing the content reception. The apparatus IDs of A, B, C indicate the first client 600A, the second client 600B, and the third client 600C, respectively.

The priority order of the apparatuses means a priority order among the clients 600 at a time when the clients 600 indicated by the apparatus IDs use the band of the LAN 500. The priority order is arbitrarily set by the user when a new client 600 is introduced to the LAN 500, for example. Alternatively, each time a new client 600 is connected to the LAN 500, the priority order of the apparatuses may be set in order of connection to the LAN 500. Alternatively, the priority order may be dynamically changed in accordance with a predetermined rule.

The content ID is information for uniquely identifying the contents, and is extracted from the SI information based on a selection by the user, for example.

The priority of the contents means a priority that is arbitrarily set by the user for viewing a content corresponding to the content ID. For example, the priority is set by performing selection from among several levels of "1: high", "2: average", and "3: low". When a user 10 omits an operation of selecting the priority, the priority of "2: average" may be automatically set.

The use band refers to a band that is used for receiving the content distributed. A specific value of the use band is obtained from the SI information, for example. Alternatively, the specific value may be obtained by making an inquiry at the IPTV server 200. If the use band is not ensured, it is difficult to desirably view the content at the client 600.

The utilization time period refers to a time period during which the band is used for receiving the content distributed. For example, in a case of the programmed recording of the content, time when the use of the band is ended is determined, and therefore the time when the use of the band is ended is registered as the utilization time period. Accordingly, in a case where the time when the use of the band is ended is not determined, the utilization time period is not set.

Figure 5:
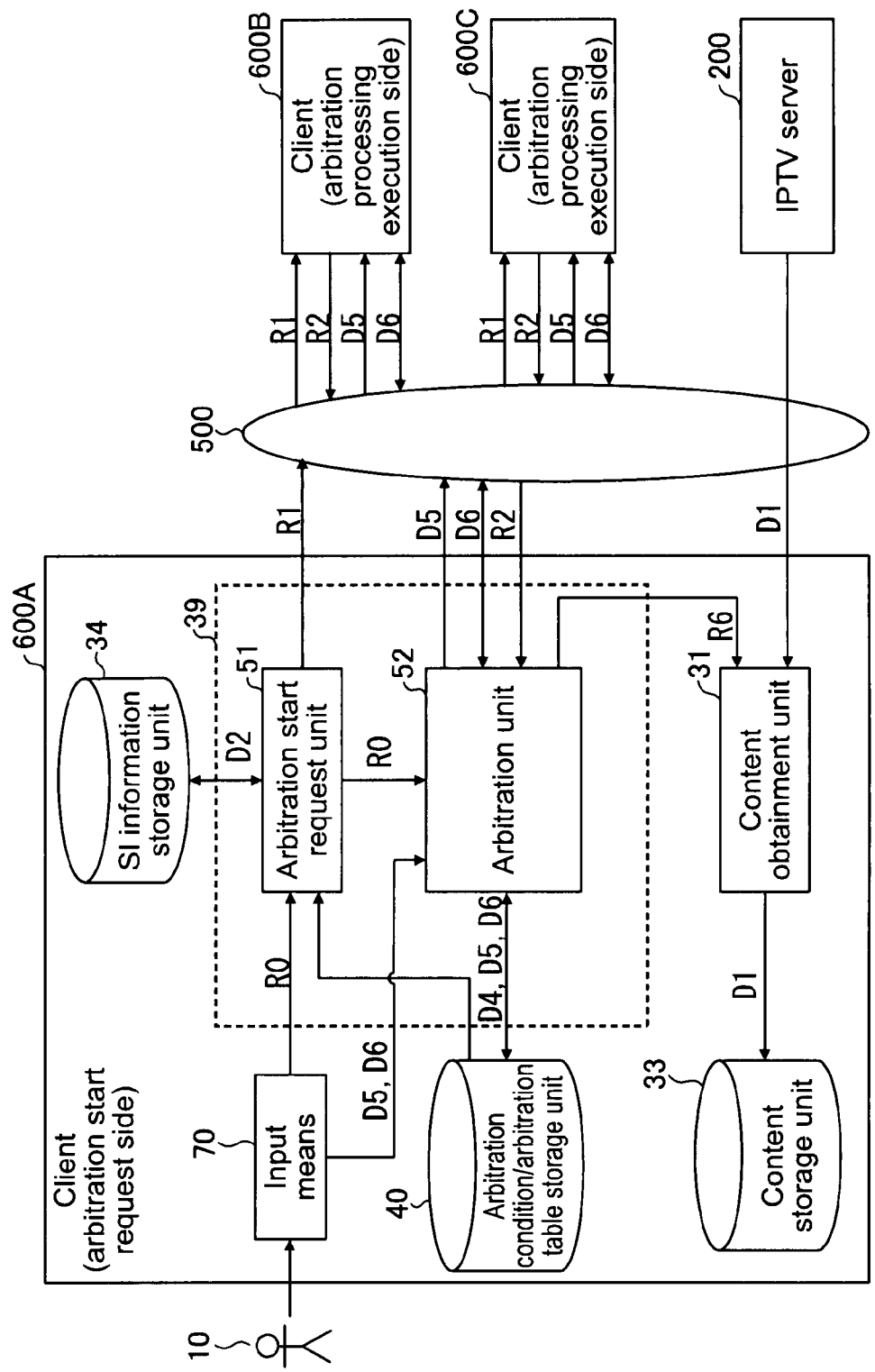
FIG. 5 is a diagram for explaining an arbitration processing unit of a client on an arbitration start request side.
Figure 6:
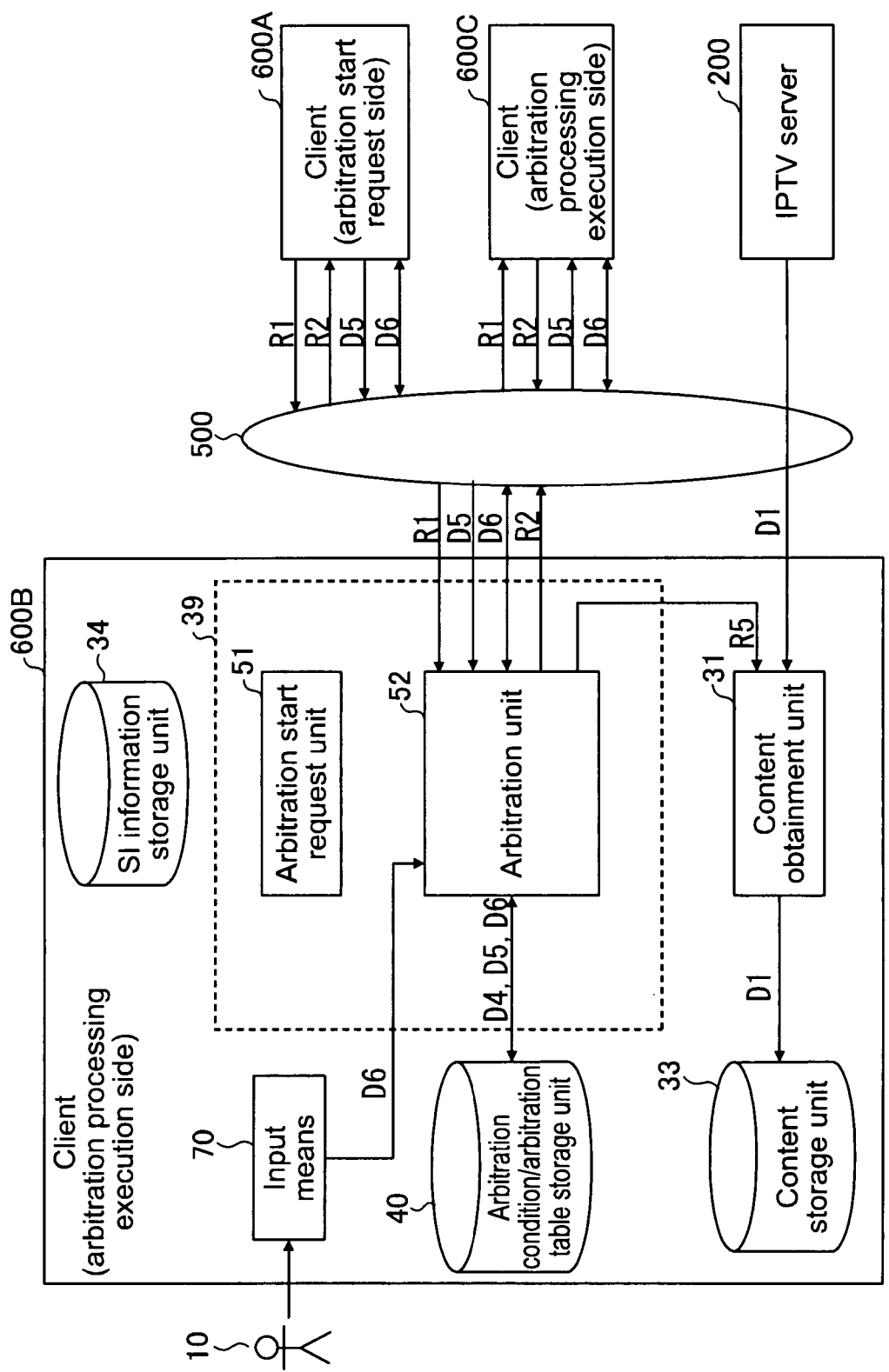
FIG. 6 is a diagram for explaining an arbitration processing unit of a client on an arbitration processing execution side.

FIGS. 5 and 6 are diagrams for explaining the arbitration processing unit 39. Specifically, FIG. 5 shows the arbitration processing unit 39 of the client 600 (in this case, client 600A) that requests to start the arbitration (i.e., on an arbitration start request side), and FIG. 6 shows the arbitration processing unit 39 of the client 600 (in this case, client 600B) that executes an arbitration processing (i.e., on an arbitration processing execution side). As shown in FIGS. 5 and 6, the arbitration processing unit 39 includes an arbitration start request unit 51 and an arbitration unit 52.

In response to a content reception request R0 from the user 10, the arbitration start request unit 51 distributes, by broadcasting or the like, an arbitration start request R1 to the second client 600B and the third client 600C on the arbitration processing execution side that are connected to the LAN 500. The arbitration start request R1 includes the use band, the broadcast end time (utilization time period), the content ID, the content priority, the apparatus ID of the content desired to be viewed, and the like.

In response to the arbitration start request R1 from another client 600, the arbitration unit 52 executes the arbitration processing so that the band of the LAN 500 is reasonably used in accordance with arbitration conditions that are predetermined among the plurality of the clients 600. In addition, the arbitration unit 52 causes the user to set the arbitration conditions, the priority order of the apparatuses, and the like, prior to the start of the arbitration processing.

(Description on Operation)

Next, a description will be given on the arbitration processing in the content transmission/reception system 100 according to this embodiment.

Before the arbitration processing is actually started, the arbitration unit 52 of any one of the clients 600, e.g., the arbitration unit 52 of the first client 600A sets the priority order of the apparatuses and the arbitration conditions based on the input from the user 10.

In this case, examples of the arbitration conditions are as follows.

Condition 1: preferentially performing a content reception for a client's apparatus having higher priority Condition 2: preferentially performing a content reception in a case of a content having higher priority Condition 3: preferentially performing a content reception for which a smaller band is used Condition 4: preferentially performing a content reception for which a shorter utilization time period is required The user (for example, user 10 of the first client 600A) as a manager of the content transmission/reception system 100 selects one or more conditions from among the above conditions 1 to 4.

For example, in a case where only Condition 1 is selected, only the arbitration condition of "preferentially performing a content reception for a client's apparatus having higher priority" is set. Further, in a case where Condition 2 and Condition 1 are selected in the stated order, the arbitration condition of "preferentially performing a content reception in a case of a content having higher priority, and in a case where there are a plurality of contents having the same priority, preferentially performing a content reception for a client's apparatus having higher priority" is set.

The setting of the arbitration conditions as described above is more specifically performed as follows. For example, the user 10 of the first client 600A requests to set the arbitration condition by using the input means 70. The request is issued to the arbitration unit 52 in the arbitration processing unit 39, and the arbitration unit 52 gives an instruction to the UI screen generation unit 36 (see, FIG. 3) to cause the external AV equipment 622 (see, FIG. 3) to display a GUI (graphical user interface) for arbitration condition setting. The arbitration unit 52 receives arbitration condition data D5 that is input by the user 10 by using the GUI for the arbitration condition setting. The arbitration unit 52 stores the arbitration condition data D5 in the arbitration condition/arbitration table storage unit 40, and transmits the arbitration condition data D5 to the second client 600B and the third client 600C as the other clients through the LAN 500 by broadcasting or the like.

The arbitration unit 52 of each of the second client 600B and the third client 600C as the other clients receives the arbitration condition data D5 from the first client 600A and stores the arbitration condition data D5 in the arbitration condition/arbitration table storage unit 40. In this way, the arbitration condition common to the clients 600 is set.

In addition, in each of the clients 600, the priority order of an apparatus of each client 600 is set. The setting of the priority order of the apparatus is performed as follows. Specifically, for example, in FIG. 5, the user 10 of the first client 600A requests to set the priority order of the apparatus by using the input means 70. The request is issued to the arbitration unit 52 in the arbitration processing unit 39, and the arbitration unit 52 gives an instruction to the UI screen generation unit 36 (see, FIG. 3) to cause the external AV equipment 622 (see, FIG. 3) to display a GUI for apparatus priority order setting. The arbitration unit 52 receives priority order data D6 of the apparatus that is input by the user 10 by using the GUI for the apparatus priority order setting. The priority order 52 stores the apparatus priority order data D6 in the arbitration condition/arbitration table storage unit 40 and transmits the apparatus priority order data D6 to the second client 600B and the third client 600C as the other clients through the LAN 500 by broadcasting or the like.

The arbitration unit 52 of each of the second client 600B and the third client 600C as the other clients receives the apparatus priority order data D6 from the first client 600A and stores the apparatus priority order data D6 in the arbitration condition/arbitration table storage unit 40. In this way, the priority order of the apparatus of the first client 600A is commonly set in the clients 600.

In the same way, the priority order of the apparatus is also set for each of the second client 600B and the third client 600C. Each time the setting is performed, the set data is transmitted to the other clients 600 and stored in the arbitration condition/arbitration table storage unit 40 of the other clients 600.

In the setting of the priority order of the apparatus for each of the clients 600, the GUI for the apparatus priority order setting is controlled by the arbitration unit 52 so as not to select the apparatus priority order that has been already set for another client 600 on the GUI by the user. Thus, the same priority order is prevented from being selected twice or more for the clients 600.

Next, an operation of the arbitration processing will be described.

Figure 7:
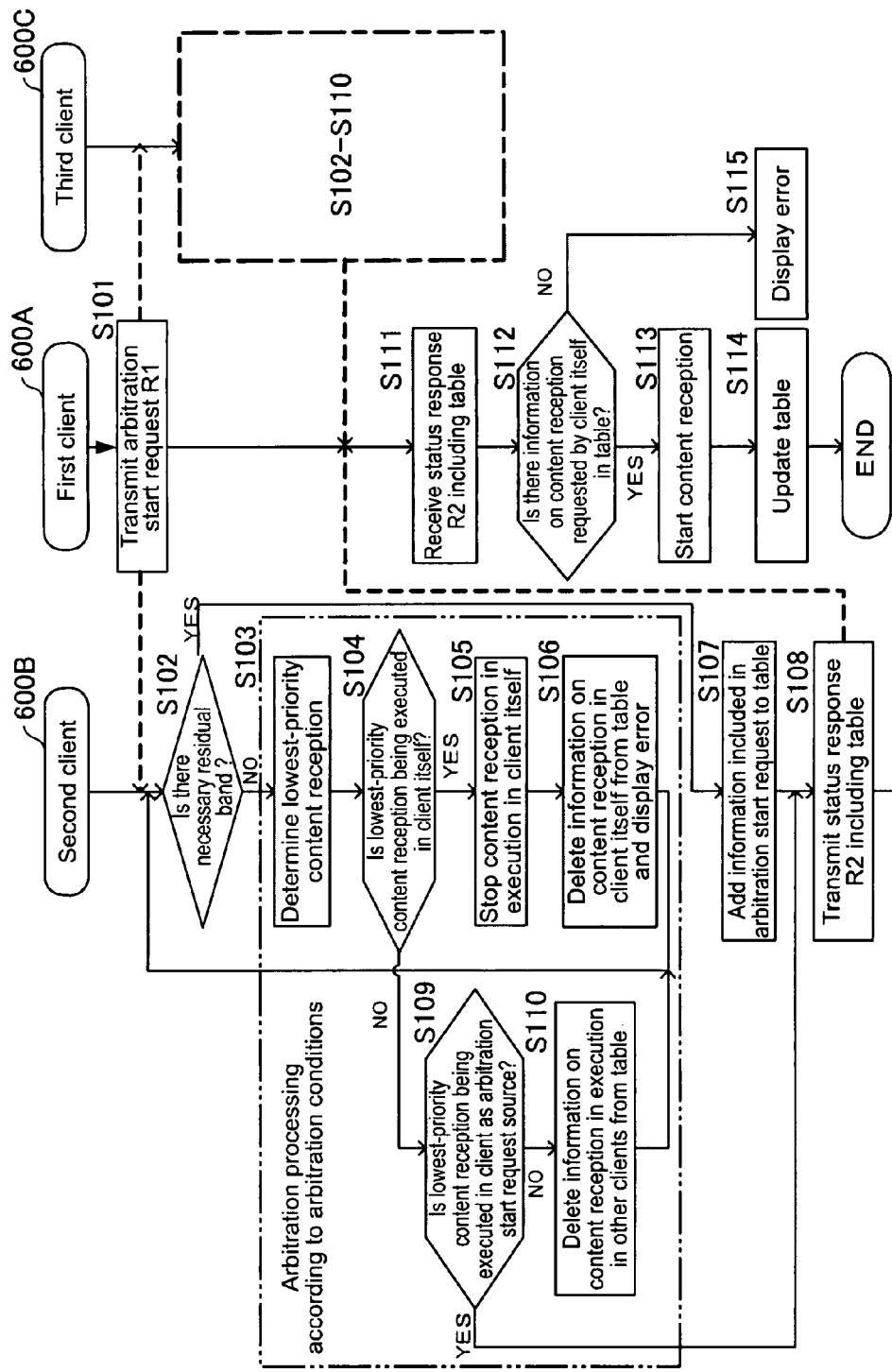
FIG. 7 is a flowchart showing an operation of the arbitration processing unit.

FIG. 7 is a flowchart showing the operation of the arbitration processing unit 39.

(FIG. 5; Operation 1 on Arbitration Start Request Side)

The user 10 of the first client 600A on an arbitration start request side inputs the content reception request R0 including the content ID and the content priority of a desired content by using the input means 70. The content reception request R0 from the user 10 is given to the arbitration start request unit 51 in the arbitration processing unit 39. Upon reception of the content reception request R0, the arbitration start request unit 51 extracts the content ID from the content reception request R0. The arbitration start request unit 51 uses the content ID as a key to obtain information items including the use band, the broadcast end time (utilization time period), and the like of the content from the SI information D2 stored in the SI information storage unit 34.

Subsequently, the arbitration start request unit 51 generates the arbitration start request R1 including, as information on one content reception, the use band and broadcast end time (utilization time period) of the content, the content ID and the priority of the content in the content reception request R0, the priority order of the apparatus of the first client 600A which is stored in the arbitration condition/arbitration table storage unit 40, and the apparatus ID. In this case, the apparatus ID is assigned to the first client 600A in advance.

The arbitration start request unit 51 distributes the arbitration start request R1 thus generated to the second client 600B and the third client 600C as the other clients connected to the LAN 500 by broadcasting or the like (Step S101). Upon reception of the arbitration start request R1, the second client 600B and the third client 600C on the arbitration processing execution side each execute the arbitration processing as follows in order to preferentially assign the band of the LAN 500 for receiving the content having higher priority. Hereinafter, because the arbitration processing is performed by the second and third clients 600B and 600C in the same way, an operation of the arbitration processing by the second client 600B will be mainly described.

(FIG. 6; Operation on Arbitration Processing Execution Side)

The arbitration unit 52 of the second client 600B on the arbitration processing execution side receives the arbitration start request R1. When executing the content reception of the arbitration start request R1 received, the arbitration unit 52 judges whether a necessary residual band remains in the LAN 500 (Step S102). That is, the arbitration unit 52 judges whether the sum of the use bands for the content receptions in execution that are registered in the arbitration table of the arbitration condition/arbitration table storage unit 40 and the use band for the content reception of the arbitration start request R1 exceeds an upper limit of the band of the LAN 500. In this case, the upper limit of the band of the LAN 500 refers to a bandwidth that can be used for the content reception in an overall physical bandwidth of the LAN 500. It should be noted that the upper limit of the band of the LAN 500 is set to be smaller than a bandwidth that can be used for the content reception through the global network 400. Accordingly, a total transmission rate from the IPTV server 200 with respect to the respective clients 600 in the LAN 500 is restricted due to the upper limit of the band of the LAN 500. In a case where the residual band necessary for performing the content reception of the arbitration start request R1 remains (YES in Step S102), the arbitration unit 52 additionally registers information items included in the arbitration start request R1 in the arbitration table of the arbitration condition/arbitration table storage unit 40 (Step S107).

Next, the arbitration unit 52 transmits a status response R2 including details D4 of the arbitration table updated to the first client 600A as the arbitration start response source (Step S108). An operation of the first client 600A that has received the status response R2 will be described later.

On the other hand, in Step S102, in a case where it is judged that no residual band necessary for the content reception of the arbitration start request R1 remains (NO in Step S102), the arbitration unit 52 performs the following arbitration processing in accordance with the arbitration condition.

The arbitration unit 52 reads the arbitration condition data D5 stored in the arbitration condition/arbitration table storage unit 40. Based on the arbitration condition read, first, the arbitration unit 52 determines a lowest-priority content reception in accordance with the arbitration condition data D5 out of the content receptions in execution that are registered in the arbitration table and the content receptions of the arbitration start request R1 (Step S103). In this case, the "lowest-priority content reception" refers to a content reception having the lowest priority in terms of the condition set as the arbitration condition. For example, in a case where Condition 1 of "preferentially performing a content reception for a client's apparatus having higher priority" is set as the arbitration condition, the "lowest-priority content reception" means a content reception by a client having the lowest-priority-order apparatus. Further, in a case where Condition 3 of "preferentially performing a content reception for which a smaller band is used" is set as the arbitration condition, the "lowest-priority content reception" means a content reception for which the smallest use band is necessary. Furthermore, in a case where Condition 2 and Condition 1 are selected in the stated order as the arbitration conditions and the arbitration condition of "preferentially performing a content reception in a case of a content having higher priority, and in a case where there are a plurality of contents having the same priority, a content reception for a client's apparatus having higher priority is preferentially performed" is set, when the content reception for the content having the lowest priority is performed by the plurality of clients, the arbitration unit 52 determines the content reception performed by the client having the lowest-priority apparatus among the plurality of clients as the lowest-priority content reception.

Next, the arbitration unit 52 judges whether the lowest-priority content reception determined is performed by the second client 600B to which the arbitration unit 52 belongs (referred to as "client itself" hereinafter) (Step S104). In a case where the lowest-priority content reception is performed by the second client 600B itself (YES in Step S104), the arbitration unit 52 gives an instruction R5 to the content obtainment unit 31 to stop the content reception. In accordance with the instruction R5, the content obtainment unit 31 stops the reception of the content data D1 in the second client 600B (Step S105). Subsequently, the arbitration unit 52 deletes information on the content reception stopped from the arbitration table, and performs an error processing so that a fact that viewing of the content is restricted due to the lack of the band is indicated to the user 10 (Step S106).

After that, the process returns to Step S102, and the arbitration unit 52 judges again whether the residual band necessary for performing the content reception of the arbitration start request R1 remains (Step S102). This time, the judgment is performed in a state where a free band is increased because one content reception by the second client 600B is stopped in Step S105. In a case where it is judged that the necessary residual band remains, the arbitration unit 52 additionally registers information included in the arbitration start request R1 in the arbitration table (Step S107) and transmits the status response R2 including the details D4 of the arbitration table updated (Step S108). In a case where no necessary residual band remains, the process proceeds to Step S103 in the same way as the above case.

In Step S104, in a case where it is judged that the lowest-priority content reception is not performed by the second client 600B itself (NO in Step S104), the arbitration unit 52 performs the following processing. The arbitration unit 52 judges whether the content reception is being executed by the first client 600A as the arbitration start request source (Step S109).

In a case where the arbitration unit 52 judges that the lowest-priority content reception is not being executed in the first client 600A as the arbitration start request source (NO in Step S109), the arbitration unit 52 performs the following processing. This case means that the lowest-priority content reception is being executed by the third client 600C. This is because the number of clients connected to the LAN 500 is three. Accordingly, the arbitration unit 52 expects that the lowest-priority content reception by the third client 600C is to be stopped, and deletes the information on the content reception from the arbitration table (Step S110). In actuality, in the third client 600C, by performing the similar arbitration processing, the lowest-priority content reception is stopped.

After that, the process returns to Step S102, the arbitration unit 52 judges again whether the residual band necessary for performing the content reception of the arbitration start request R1 remains (Step S102). This time, the judgment is performed in a state where a free band is increased because one content reception by the third client 600C is stopped. In a case where it is judged that the necessary residual band remains, the arbitration unit 52 additionally registers information included in the arbitration start request R1 in the arbitration table (Step S107). Then, the arbitration unit 52 transmits the status response R2 including the details D4 of the arbitration table updated (Step S108). In a case where it is judged that no necessary residual band remains in Step S102, the process proceeds to Step S103.

In Step S109, in a case where it is judged that the lowest-priority content reception is being executed by the first client 600A as the arbitration start request source (YES in Step S109), the arbitration unit 52 performs the following processing. The arbitration unit 52 expects that the content reception is not started by the first client 600A, and transmits the status response R2 including the details D4 of the existing arbitration table to the first client 600A (Step S108). An operation of the first client 600A that has received the status response R2 will be described later.

The above processings are summarized as follows.

1. In the case where the residual band necessary for performing the content reception of the arbitration start request R1 remains, the arbitration unit 52 on the arbitration processing execution side registers, in the arbitration table, the information included in the arbitration start request R1 and updates the arbitration table. Subsequently, the arbitration unit 52 transmits the status response R2 including the details D4 of the arbitration table updated to the client as the arbitration start request source.

2. In the case where no residual band necessary for performing the content reception of the arbitration start request R1 remains, the arbitration unit 52 on the arbitration processing execution side determines the lowest-priority content reception among the content receptions specified in the arbitration start request R1 and the content receptions registered in the arbitration table.

3. In the case where the lowest-priority content reception is performed by the client itself, the arbitration unit 52 on the arbitration processing execution side stops the content reception and updates the arbitration table. Subsequently, the arbitration unit 52 transmits the status response R2 including the details D4 in the arbitration table updated to the client as the arbitration start request source.

4. In the case where the lowest-priority content reception is performed by the client as the arbitration start request source, the arbitration unit 52 on the arbitration processing execution side transmits the status response R2 including the details D4 of the existing arbitration table to the client as the arbitration start request source.

5. In the case where the lowest-priority content reception is performed by the other client, the arbitration unit 52 on the arbitration processing execution side deletes the information on the lowest-priority content reception from the arbitration table and updates the arbitration table. Subsequently, the arbitration unit 52 transmits the status response R2 including the details D4 of the arbitration table updated to the client as the arbitration start request source.

The arbitration processings on the arbitration processing execution side that has received the arbitration start request R1 as described above are also performed in the third client 600C in the same way.

(FIG. 5; Operation 2 on Arbitration Start Request Side)

Next, a description will be given on an operation in a case where the arbitration unit 52 of the first client 600A on the arbitration start request side receives the status response R2.

Upon reception of the status response R2 (Step S111), the arbitration unit 52 of the first client 600A on the arbitration start request side performs the following processing. The arbitration unit 52 judges whether the information on the content reception of the arbitration start request R1 transmitted by the first client 600A in Step S101 is included in the details D4 of the arbitration table included in the status response R2 received (Step S112). In this case, the fact that the information on the content reception of the arbitration start request R1 is included in the details D4 of the arbitration table of the status response R2 means that the residual band necessary for the content reception remains. Thus, the arbitration unit 52 gives an instruction R6 to the content obtainment unit 31 to start to receive the data D1 of the content in accordance with the content reception request R0 input by the user 10. According to the instruction R6, the content obtainment unit 31 starts to receive the data D1 of the content (Step S113). Along with this, the arbitration unit 52 updates the details D4 of the arbitration table stored in the arbitration condition/arbitration table storage unit 40 to the details D4 of the arbitration table included in the status response R2 (Step S114). As a result, consistency of the arbitration tables among the clients 600 is ensured.

In actuality, the first client 600A of the arbitration start request source asynchronously receives the status response R2 from each of the second client 600B and the third client 600C as the two clients on the arbitration processing execution side. The details D4 of the arbitration tables included in the two status responses R2 are the same at any time. Therefore, the arbitration unit 52 of the first client 600A as the arbitration start request source may perform the processing of Step S112 using the details D4 of the arbitration table included in the status response R2 received first. Alternatively, the arbitration unit 52 checks the details D4 of the arbitration tables included in the two status responses R2 with each other, and when the details D4 coincide, the arbitration unit 52 may perform the processing of Step S112. When the details D4 do not coincide, the arbitration unit 52 may perform an error processing of indicating an error, for example.

In addition, in Step S112, a case where the information on the content reception of the arbitration start request R1 is not included in the details D4 of the arbitration table in the status response R2 means that no residual band for the content reception remains. Accordingly, the arbitration unit 52 instructs the UI screen generation unit 36 (see, FIG. 3) to display an error indication, that is, display that the residual band for the content reception by the first client 600A is insufficient. The UI screen generation unit 36 generates data of an error display screen in accordance with the instruction, and outputs the data to the external AV equipment 622 (see, FIG. 3) through the AV interface unit 606. In this way, the error indication is displayed (Step S115).

The above is the description on the arbitration processing in the first client 600A on the arbitration start request side which has received the status response R2.

(Specific Example 1 of Arbitration Processing)

Next, a description will be given on specific examples of the arbitration operation in the content transmission/reception system 100 in this embodiment.

FIG. 8 is a diagram showing an example of an arbitration table of the second client 600B and the third client 600C at a certain time point. Let us assume that at the time point, in the second client 600B whose apparatus ID is "B", data of a content whose content ID is "abcd123" is being received, and in the third client 600C whose apparatus ID is "C", data of a content whose content ID is "efgh456" is being received. The apparatus priority order among the clients 600A, 600B, and 600C is set to an order of C, B, and A. The apparatus priority order is fixedly set.

In this situation, consideration will be given to a case where the user 10 of the first client 600A inputs, by using the input means 70, the content reception request R0 including the content ID, the content priority, and, as necessary, the utilization time period of a content that the user 10 wants to view.

The content reception request R0 input by the user 10 by using the input means 70 is input to the arbitration start request unit 51 of the arbitration processing unit 39. Upon reception of the content reception request R0, the arbitration start request unit 51 extracts the content ID from the content reception request R0. The arbitration start request unit 51 extracts, by using the content ID as a key, information items on the use band, the broadcast end time (utilization time period), and the like of the corresponding content from the SI information D2 stored in the SI information storage unit 34.

Then, the arbitration start request unit 51 generates the arbitration start request R1 including the content ID and the content priority in the content reception request R0, the use band the broadcast end time (utilization time period) that are extracted from the SI information D2, the apparatus ID (=A) previously assigned to the first client 600A, and the like. FIG. 9 is a diagram showing an example of the information on the content reception included in the arbitration start request R1 generated in the first client 600A. The arbitration start request unit 51 transmits the arbitration start request R1 generated to the other clients, that is, the second client 600B and the third client 600C that are connected to the LAN 500 by broadcasting or the like (Step S101).

Upon reception of the arbitration start request R1, the second client 600B and the third client 600C each perform the following arbitration processing in the arbitration unit 52 in the arbitration processing unit 39 thereof.

First, the arbitration processing in the second client 600B will be described. The arbitration unit 52 of the second client 600B receives the arbitration start request R1 from the first client 600A. Then, the arbitration unit 52 judges whether the sum of the use bands for the content receptions in execution that are registered in the arbitration table and the use band for the content reception of the arbitration start request R1 exceeds an upper limit of the band of the LAN 500 (Step S102).

Let us assume that the upper limit of the band of the LAN 500 is set to 3 Mbit/s. The sum of the use bands for the content receptions in execution registered in the arbitration table is 2.8 Mbit/s as shown in FIG. 8. The use band for the content reception of the arbitration start request R1 is 1.4 Mbit/s as shown in FIG. 9. Accordingly, the sum of the use bands is 4.2 Mbit/s, which exceeds the upper limit of the band of the LAN 500, i.e., 3 Mbit/s. In view of this, the arbitration unit 52 determines a lowest-priority content reception among content receptions registered in the arbitration table and the content reception of the arbitration start request R1 in accordance with the arbitration conditions (Step S103).

Here, let us assume that Condition 2 and Condition 1 are selected in the stated order as the arbitration conditions, and the arbitration condition of "preferentially performing a content reception in a case of a content having higher priority, and in a case where there are the plurality of contents having the same priority, a content reception for a client's apparatus having higher priority is preferentially performed" is set. Accordingly, the arbitration unit 52 judges that the content reception that is being executed by the second client 600B that has received the arbitration start request R1 has the lowest priority (YES in Step S104). As a result, the arbitration unit 52 gives an instruction to the content obtainment unit 31 to stop the content reception that is being executed by the second client 600B itself, and the content reception is stopped (Step S105). Subsequently, the arbitration unit 52 deletes, from the arbitration table, the information on the content reception stopped, and performs the error processing of displaying the fact that viewing of the content is restricted due to the lack of the band to the user 10 (Step S106).

As a result of the stop of the content reception, as shown in FIG. 10, the use bands registered in the arbitration table of the third client 600C is 1.5 Mbit/s in total, and the sum of the above use band and the use band of the content reception of the arbitration start request R1 is 2.9 Mbit/s, which is less than the upper limit of the band of the LAN 500.

Next, the arbitration unit 52 adds information on the content reception included in the arbitration start request R1 to the arbitration table (Step S107). As a result, the arbitration table is updated as shown in FIG. 11. After that, the arbitration unit 52 transmits, to the first client 600A as the arbitration start request source, the status response R2 including the details D4 of the arbitration table updated (Step S108).

On the other hand, the arbitration unit 52 of the third client 600C also receives the arbitration start request R1 from the first client 600A. The arbitration unit 52 of the third client 600C judges whether the sum of the use bands for the content receptions in execution that are registered in the arbitration table and the use band for the content reception of the arbitration start request R1 exceeds an upper limit of the band of the LAN 500 (Step S102). In this case, because the content of the arbitration table of the third client 600C is the same as that of the second client 600B as shown in FIG. 8, the sum of the use bands is 4.2 Mbit/s, which exceeds the upper limit of the band of the LAN 500, i.e., 3 Mbit/s. In view of this, the arbitration unit 52 determines a lowest-priority content reception among content receptions registered in the arbitration table and the content reception of the arbitration start request R1 in accordance with the arbitration conditions (Step S103). Also, the arbitration unit 52 judges that the content reception that is being executed by the second client 600B is the lowest priority as in the judgment of the second client 600B (NO in Step S109). The arbitration unit 52 deletes the information on the content reception in execution in the second client 600B from the arbitration table (Step S110). As a result, the use bands registered in the arbitration table of the third client 600C is 1.5 Mbit/s in total, and the sum of the above use bands and the use band of the content reception of the arbitration start request R1 is 2.9 Mbit/s, which is less than the upper limit of the band of the LAN 500.

After that, the arbitration unit 52 transmits, to the first client 600A as the arbitration start request source, the status response R2 including the details D4 of the arbitration table updated (Step S108).

As described above, from the second client 600B and the third client 600C that have received the arbitration start request R1, the status responses R2 including the same details D4 (FIG. 11) of the arbitration tables are transmitted to the first client 600A as the arbitration start request source through the arbitration processings by the arbitration units 52.

The arbitration unit 52 of the first client 600A as the arbitration start request source judges whether the information on the content reception of the arbitration start request R1 self-transmitted is included in the details D4 of the arbitration table included in the status response R2 received in Step S111 (Step S112). As shown in FIG. 11, the information on the content reception of the arbitration start request R1 self-transmitted is included in the arbitration table included in the status response R2 received, and therefore the arbitration unit 52 can be informed of the fact that the residual band necessary for the content reception remains. Thus, in accordance with the content reception request R0 from the user, the arbitration unit 52 gives the instruction R6 to the content obtainment unit 31 to start the content reception. In accordance with the instruction R6, the content obtainment unit 31 starts to receive the data D1 of the content (Step S113). Along with this, the arbitration unit 52 updates the details D4 of the arbitration table stored in the arbitration condition/arbitration table storage unit 40 to the details D4 of the arbitration table included in the status response R2 (Step S114).

(Specific Example 2 of Arbitration Processing)

Next, a description will be given on another specific example of the arbitration operation in the content transmission/reception system 100 according to this embodiment.

Let us assume that the arbitration start request R1 including information on the content reception shown in FIG. 12 is input from the first client 600A in a state where the second client 600B and the third client 600C each have the arbitration table shown in FIG. 8. The information shown in FIG. 12 is different from the information included in the arbitration start request R1 shown in FIG. 9 in that the priority of the content is "3".

Upon reception of the arbitration start request R1, the second client 600B and the third client 600C each perform the following arbitration processing in the arbitration unit 52 in the arbitration processing unit 39 thereof.

First, the arbitration processing in the second client 600B will be described. The arbitration unit 52 of the second client 600B receives the arbitration start request R1 from the first client 600A. Then, the arbitration unit 52 judges whether the sum of the use bands for the content receptions in execution that are registered in the arbitration table and the use band for the content reception of the arbitration start request R1 exceeds an upper limit of the band of the LAN 500 (Step S102).

Let us assume that the upper limit of the band of the LAN 500 is set to 3 Mbit/s. The sum of the use bands for the content receptions in execution registered in the arbitration table is 2.8 Mbit/s as shown in FIG. 8. The use band for the content reception of the arbitration start request R1 is 1.4 Mbit/s as shown in FIG. 12. Accordingly, the sum of the use bands is 4.2 Mbit/s, which exceeds the upper limit of the band of the LAN 500, i.e., 3 Mbit/s. In view of this, the arbitration unit 52 determines a lowest-priority content reception among content receptions registered in the arbitration table and the content reception of the arbitration start request R1 in accordance with the arbitration conditions (Step S103).

Here, let us assume that Condition 2 and Condition 1 are selected in the stated order as the arbitration conditions, and the arbitration condition of "preferentially performing a content reception in a case of a content having higher priority, and in a case where there are the plurality of contents having the same priority, a content reception for a client's apparatus having higher priority is preferentially performed" is set. In this example, the content priority for the content reception of the second client 600B is 3 and the content priority for the content reception of the arbitration start request R1 is also 3. Therefore, the two content receptions are determined as candidates for the lowest-priority content reception. In this case, the arbitration unit 52 compares the priority of the apparatus of the second client 600B with the priority of the apparatus (first client 600A) of the arbitration start request R1. Then, the arbitration unit 52 finally judges that the content reception performed by the client whose apparatus priority is lower is the lowest priority content reception. In this example, the priority order of the apparatus of the second client 600B is 2 (=average), and the priority order of the apparatus (first client 600A) of the arbitration start request R1 is 3 (=low). Accordingly, the content reception of the arbitration start request R1 is finally determined as the lowest-priority content reception (YES in Step S109). Thus, the arbitration unit 52 transmits, to the first client 600A as the arbitration start request source, the status response R2 including the details D4 (FIG. 8) of the current arbitration table (Step S108).

On the other hand, in the third client 600C, the content reception of the arbitration start request R1 is also finally determined as the lowest-priority content reception, and the arbitration unit 52 transmits, to the first client 600A as the arbitration start request source, the status response R2 including the details D4 (FIG. 8) of the current arbitration table.

The arbitration unit 52 of the first client 600A as the arbitration start request source judges whether the information on the content reception of the arbitration start request R1 is included in the details D4 of the arbitration table included in the status response R2 received in Step S111 (Step S112). As shown in FIG. 8, the arbitration table included in the status response R2 received does not include the information on the content reception of the arbitration start request R1. Therefore, the arbitration unit 52 instructs the UI screen generation unit 36 (see, FIG. 3) to display an error indication, that is, display that the residual band for the content reception required by the first client 600A is insufficient. The UI screen generation unit 36 generates data of an error display screen in accordance with the instruction, and outputs the data to the external AV equipment 622 through the AV interface unit 606. In this way, the error indication is displayed (Step S115).
(Arbitration Processing in Case where Number of Clients is Four or More)

In the above description, the case where the number of clients is three is described. The arbitration processing in a case where four or more clients are used is as follows.

Figure 19:
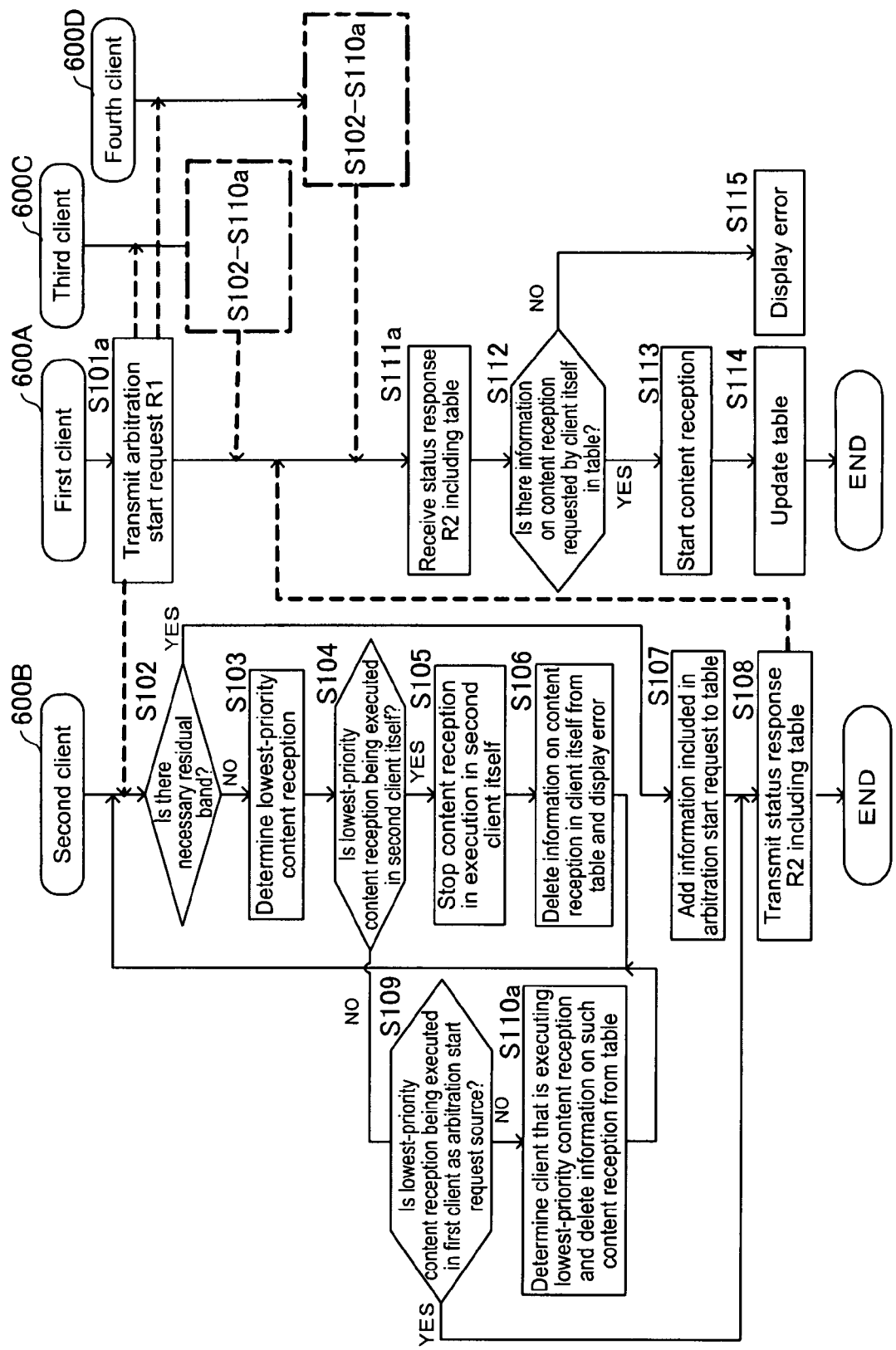
FIG. 19 is a flowchart showing an arbitration processing in a case where the number of clients is four or more.

FIG. 19 is a flowchart of the arbitration processing in the case where four or more clients are used.

Differences between the flowcharts shown in FIGS. 19 and 7 lie in Step S101a, Step S110a, and Step S111a. In this example, the number of clients is four.

In Step S101a, the arbitration start request unit 51 of the first client 600A on the arbitration start request side transmits the arbitration start request R1 to the second client 600B, the third client 600C, and a fourth client 600D that serve as the clients on the arbitration processing execution side.

The arbitration processing similar to that shown in the flowchart of FIG. 7 is performed in the arbitration unit 52 of each of the clients 600B, 600C, and 600D on the arbitration processing execution side. However, in Step S110a, the arbitration unit 52 determines one from the other clients, which is executing the lowest-priority content reception, and deletes information on the content reception from the arbitration table. In this case, "the other clients" refers to clients other than the client on the arbitration start request side and other than the client itself that receives the arbitration start request R1 and executes the arbitration processing. Specifically, in a case where the first client 600A is the arbitration start request source and the second client 600B is a client itself that receives the arbitration start request R1 and executes the arbitration processing, the other clients are the third client 600C and the fourth client 600D.

In the step S111a, the arbitration unit 52 of the first client 600A on the arbitration start request side receives the status responses R2 from the second client 600B, the third client 600C, and the fourth client 600D that serve as the clients on the arbitration processing execution side.

The other operation is the same as that shown in the flowchart of FIG. 7. The above operation is also applied to a case where the number of clients is five or more.

Second Embodiment

In the first embodiment, in the case where the lowest-priority content reception is executed by the second client 600B itself (YES in Step S104), the arbitration unit 52 stops the content reception (Step S105). Then, the arbitration unit 52 deletes the information on the content reception stopped from the arbitration table.

In a case where a content distributed by the unicast method such as VOD, even when the reception of the content is temporarily stopped, content data already obtained may be left as it is and the reception of content data may be restarted when a residual band for the content reception is generated.

To perform the above control, in the second embodiment, a valid flag is added to the arbitration table.

FIG. 13 is a diagram showing a structure of the arbitration table to which the valid flag is added. For each entry of the arbitration table, the valid flag is set. The arbitration unit 52 of the arbitration processing unit 39 performs control so that the valid flag is set to a valid (on) value with respect to a content that is being actually received and set to an invalid (off) value with respect to a content that is stopped to be received (in a standby state). In the example shown in FIG. 13, the valid flags for the reception content of the second client 600B whose apparatus ID is B and the reception content of the third client 600C whose apparatus ID is C are set to be on, which indicates that the contents are being received.
(Description on Operation)

Next, a description will be given on an arbitration processing in the content transmission/reception system 100 according to this embodiment.

Figure 14:
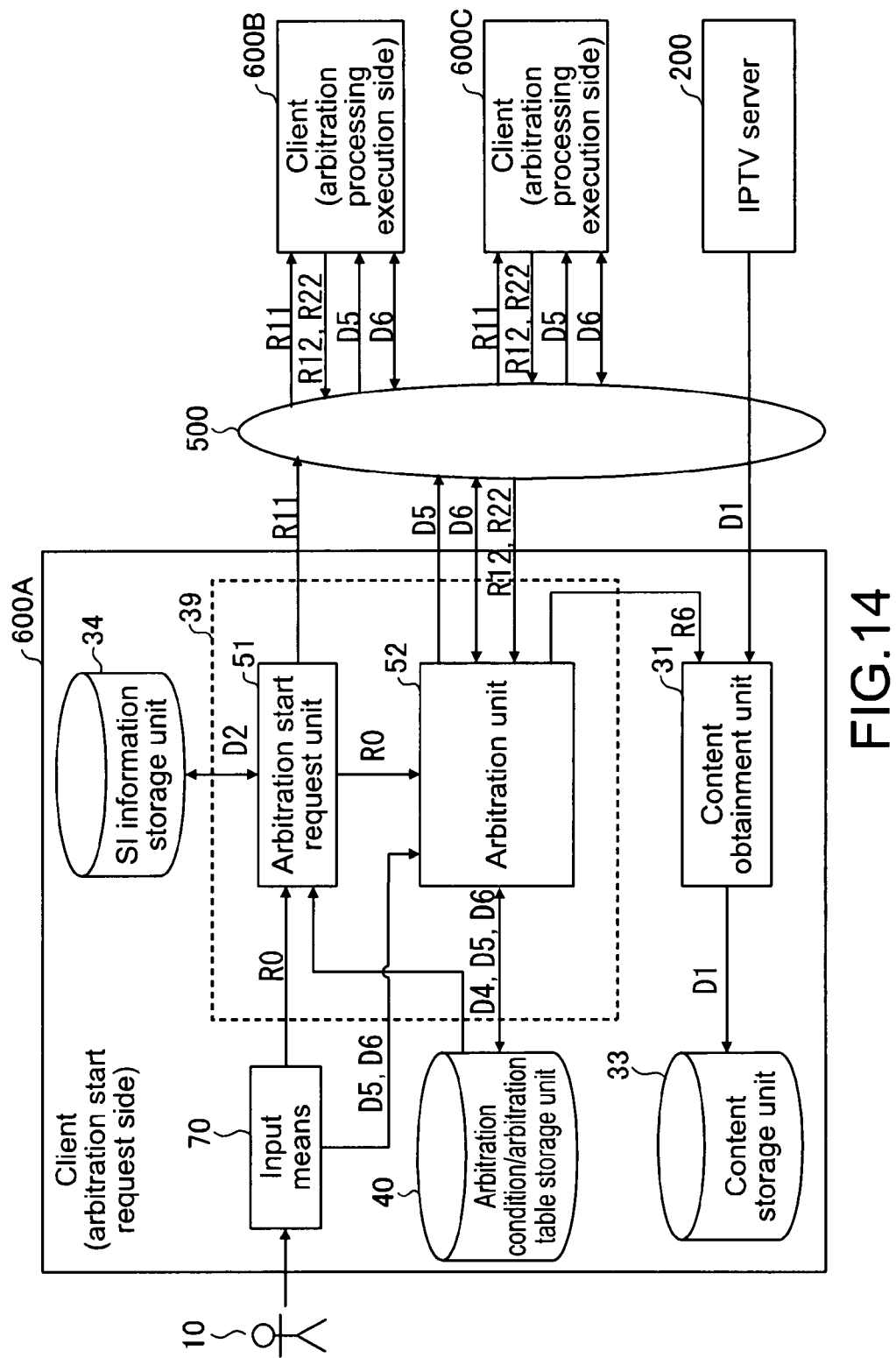
FIG. 14 is a diagram for explaining an arbitration processing unit of a client on an arbitration start request side according to a second embodiment.
Figure 15:
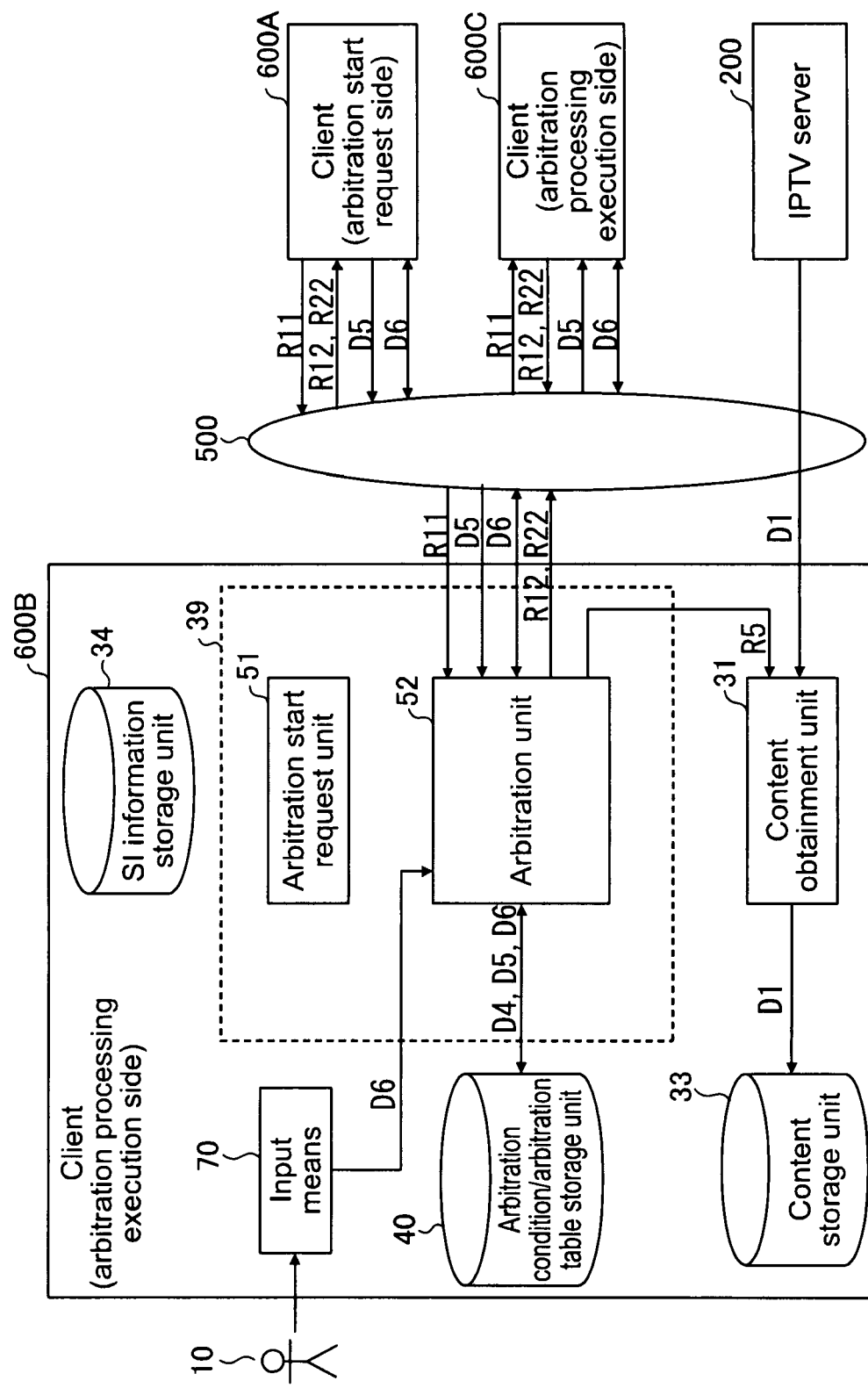
FIG. 15 is a diagram for explaining an arbitration processing unit of a client on an arbitration processing execution side according to the second embodiment.
Figure 16:
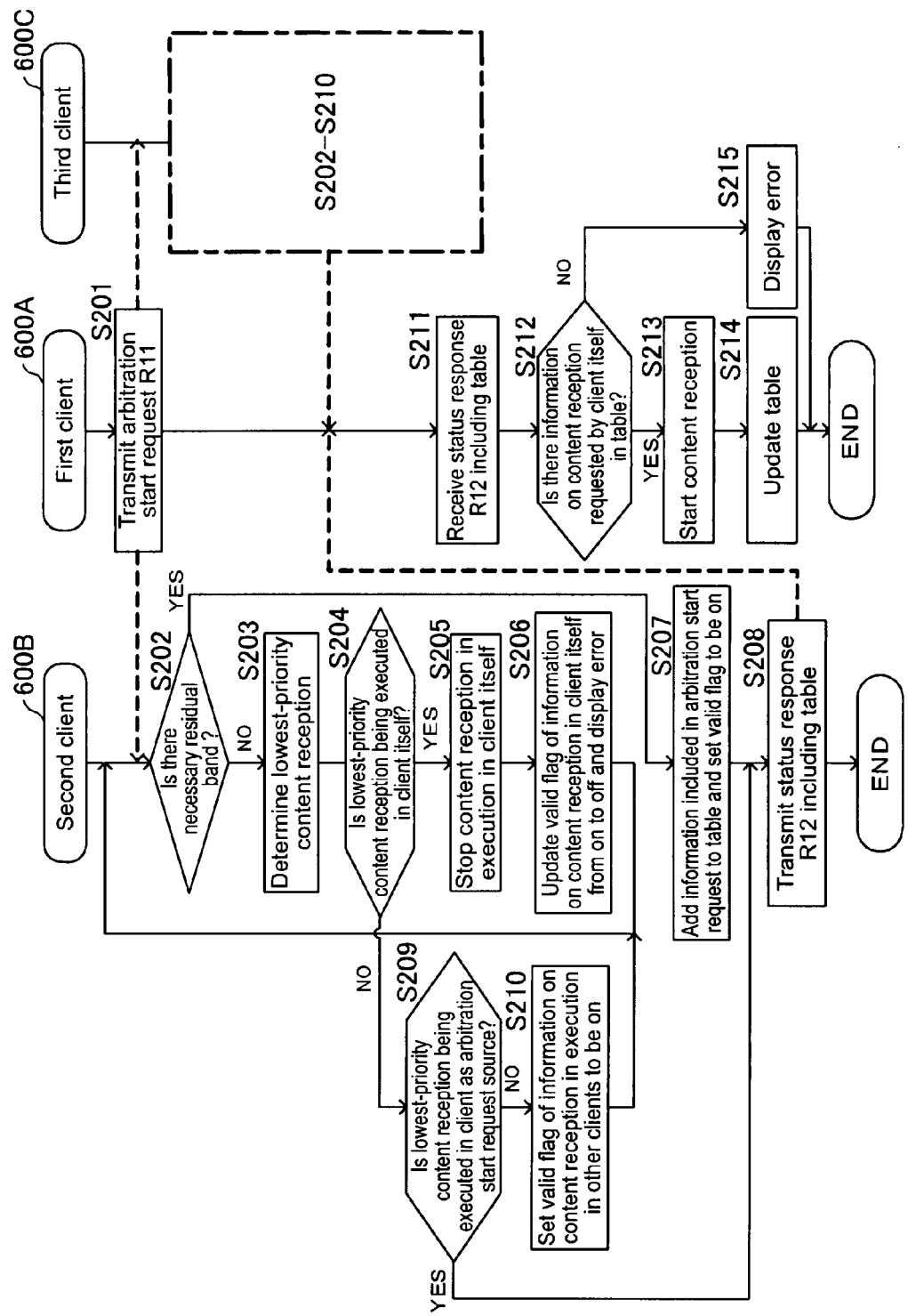
FIG. 16 is a flowchart showing an operation of the arbitration processing unit according to the second embodiment.

FIG. 14 is a diagram for explaining an operation of the arbitration processing unit 39 of the client 600 on the arbitration start request side. FIG. 15 is a diagram for explaining an operation of the arbitration processing units 39 of the clients 600 on the arbitration processing execution side. FIG. 16 is a flowchart showing the operation of the arbitration processing unit 39. In this case, let us assume that the client on the arbitration start request side is the first client 600A and the clients on the arbitration processing execution side are the second client 600B and the third client 600C.

First, the arbitration conditions are set before the actual arbitration processing is started. The setting of the arbitration conditions is the same as that in the first embodiment, and thus a description thereof will be omitted.
(FIG. 14; Operation 1 on Arbitration Start Request Side)

When the user 10 of the first client 600A on the arbitration start request side inputs, by using the input means 70, the content reception request R0 including a content ID and a content priority of a desired content, the content reception request R0 from the user 10 is given to the arbitration start request unit 51 in the arbitration processing unit 39.

Upon reception of the content reception request R0, the arbitration start request unit 51 extracts the content ID from the content reception request R0. The arbitration start request unit 51 obtains information items on the use band, the broadcast end time (utilization time period), and the like of the corresponding content from the SI information D2 stored in the SI information storage unit 34 by using the content ID as a key. Then, the arbitration start request unit 51 generates an arbitration start request R11 including, as information on one content reception, the content ID and the content priority in the content reception request R0 and the valid flag, the apparatus ID, the use band, and the broadcast end time (utilization time period) in the SI information D2. In this case, valid flag is not set (set to invalid value). The arbitration start request unit 51 distributes the arbitration start request R11 thus generated to the second client 600B and the third client 600C that are the clients on the arbitration processing execution side connected to the LAN 500 by broadcasting or the like (Step S201).

Upon reception of the arbitration start request R11, the second client 600B and the third client 600C on the arbitration processing execution side each perform the following processing so that the band of the LAN 500 is preferentially assigned to the reception of the content having higher priority. Hereinafter, the operation of the arbitration processing in the second client 600B will be mainly described, because the arbitration processings in the second and third clients 600B and 600C are the same.

(FIG. 15; Operation on Arbitration Processing Execution Side)

Upon reception of the arbitration start request R11, the arbitration unit 52 of the second client 600B on the arbitration processing execution side judges whether the residual band necessary for executing the content reception of the arbitration start request R11 remains in the LAN 500 (Step S202). That is, the arbitration unit 52 judges whether the sum of the use bands for the content receptions in execution that are registered in the arbitration table of the arbitration condition/arbitration table storage unit 40 and the use band for the content reception of the arbitration start request R11 exceeds an upper limit of the band of the LAN 500. In this case, the upper limit of the band of the LAN 500 refers to a predetermined bandwidth preserved for obtaining the content in an overall physical bandwidth of the LAN 500. It should be noted that the upper limit of the band of the LAN 500 is set to be smaller than a predetermined bandwidth that is preserved for obtaining the content and can be used through the global network 400. Accordingly, a total transmission rate of the content data D1 from the IPTV server 200 with respect to the respective clients 600 in the LAN 500 is restricted due to the upper limit of the band of the LAN 500.

In a case where the residual band necessary for performing the content reception of the arbitration start request R11 remains (YES in Step S202), the arbitration unit additionally registers information items included in the arbitration start request R11 in the arbitration table of the arbitration condition/arbitration table storage unit 40, and sets a value of a valid flag in the information additionally registered to be on (Step S207). After that, the arbitration unit 52 transmits, to the first client 600A as the arbitration start request source, a status response R12 including the details D4 of the arbitration table updated (Step S208). An operation of the first client 600A that has received the status response R12 will be described later.

On the other hand, in Step S202, in a case where it is judged that no residual band necessary for the content reception of the arbitration start request R11 remains (NO in Step S202), the arbitration unit 52 performs the following arbitration processing. The arbitration unit 52 reads the arbitration condition stored in the arbitration condition/arbitration table storage unit 40. The arbitration unit 52 determines a lowest-priority content reception in accordance with the arbitration condition out of the content receptions in execution that are registered in the arbitration table and the content receptions of the arbitration start request R11 (Step S203).

Subsequently, the arbitration unit 52 judges whether the lowest-priority content reception determined is performed by the second client 600B itself (Step S204). In a case where the lowest-priority content reception is performed by the second client 600B itself (YES in Step S204), the arbitration unit 52 gives an instruction R5 to the content obtainment unit to stop the content reception. In accordance with the instruction R5, the content obtainment unit 31 stops the reception of the content data D1 by the second client 600B itself (Step S205). Subsequently, the arbitration unit 52 updates, from on to off, the value of the valid flag in the information on the content reception stopped, which is stored in the arbitration table, and performs an error processing so that a fact that viewing of the content is restricted due to the lack of the band is indicated to the user 10 (Step S206).

After that, the process returns to Step S202, and the arbitration unit 52 judges again whether the residual band necessary for performing the content reception of the arbitration start request R11 remains (Step S202). This time, the judgment is performed in a state where a free band is increased because one content reception by the second client 600B is stopped in Step S205. In a case where it is judged that the necessary residual band remains, the arbitration unit 52 additionally registers information included in the arbitration start request R11 to the arbitration table (Step S207) and transmits the status response R12 including the details D4 of the arbitration table updated (Step S208). In a case where no necessary residual band remains, the process proceeds to Step S203 in the same way as the above case.

In Step S204, in a case where it is judged the lowest-priority content reception is not performed by the second client 600B itself (NO in Step S204), the arbitration unit 52 performs the following processing. The arbitration unit 52 judges whether the content reception is being executed by the first client 600A as the arbitration start request source (Step S209).

In a case where the arbitration unit 52 judges that the lowest-priority content reception is not in execution in the first client 600A as the arbitration start request source (NO in Step S209), the arbitration unit 52 performs the following processing. This case means that the lowest-priority content reception is being executed by the third client 600C. This is because the number of clients 600 connected to the LAN 500 is three. Accordingly, the arbitration unit 52 expects that the lowest-priority content reception by the third client 600C is stopped, and updates the value of the valid flag in the information on the content reception in the arbitration table from on to off (Step S210). In actuality, in the third client 600C, by performing the similar arbitration processing, the lowest-priority content reception is stopped.

After that, the process returns to Step S202, the arbitration unit 52 judges again whether the residual band necessary for performing the content reception of the arbitration start request R11 remains (Step S202). This time, the judgment is performed in a state where a free band is increased because one content reception by the third client 600C is stopped. In a case where it is judged that the necessary residual band remains, the arbitration unit 52 additionally registers information included in the arbitration start request R11 in the arbitration table (Step S207). Then, the arbitration unit 52 transmits, to the first client 600A, the status response R12 including the details D4 of the arbitration table updated (Step S208). In a case where it is judged that no necessary residual band remains in Step S202, the process proceeds to Step S203.

In Step S209, in a case where it is judged that the lowest-priority content reception is being executed by the first client 600A as the arbitration start request source (YES in Step S209), the arbitration unit 52 performs the following processing. The arbitration unit 52 expects that the content reception is not started by the first client 600A, and transmits the status response R12 including the details D4 of the existing arbitration table to the first client 600A (Step S208). An operation of the first client 600A that has received the status response R12 will be described later.

The above is the description on the arbitration processing in the second client 600B on the arbitration processing execution side that has received the arbitration start request R11. The above arbitration processing is performed in the third client 600C in the same way.

Next, a description will be given on an operation in a case where the arbitration unit 52 of the first client 600A as the arbitration start request source receives the status response R12.

(FIG. 14; Operation 2 on Arbitration Start Request Side)

Upon reception of the status response R12 (Step S211), the arbitration unit 52 of the first client 600A on the arbitration start request side performs the following processing. The arbitration unit 52 judges whether the information on the content reception of the arbitration start request R11 transmitted by the first client 600A in Step S201 is included in the details D4 of the arbitration table included in the status response R12 received (Step S212). In this case, the fact that the information on the content reception of the arbitration start request R11 is included in the details D4 of the arbitration table of the status response R12 means that the residual band necessary for the content reception remains. Thus, the arbitration unit 52 gives the instruction R6 to the content obtainment unit 31 to start to receive the content in accordance with the content reception request R0 input by the user. In accordance to the instruction R6, the content obtainment unit 31 starts to receive the data D1 of the content (Step S213). Along with this, the arbitration unit 52 updates the details D4 of the arbitration table stored in the arbitration condition/arbitration table storage unit 40 to the details D4 of the arbitration table included in the status response R12 (Step S214). As a result, consistency of the arbitration tables among the clients 600 is ensured.

In actuality, the first client 600A of the arbitration start request source asynchronously receives the status response R12 from each of the second client 600B and the third client 600C as the two clients on the arbitration processing execution side. The details D4 of the arbitration tables included in the two status responses R12 are the same at any time. Therefore, the arbitration unit 52 of the first client 600A as the arbitration start request source may perform the processing of Step S212 by using the details D4 of the arbitration table included in the status response R12 received first. Alternatively, the arbitration unit 52 checks the details D4 of the arbitration tables included in the two status responses R12 with each other, and when the details D4 coincide, the arbitration unit 52 may perform the processing of Step S212. When the details D4 do not coincide, the arbitration unit 52 may perform an error processing of indicating an error, for example.

In addition, in Step S212, a case where the information on the content reception of the arbitration start request R11 is not included in the details D4 of the arbitration table in the status response R12 means that no residual band for the content reception remains. Accordingly, the arbitration unit 52 instructs the UI screen generation unit 36 (see, FIG. 3) to display an error indication, that is, display that the residual band for the content reception by the first client 600A is insufficient. The UI screen generation unit 36 generates data of an error display screen in accordance with the instruction, and outputs the data to the external AV equipment 622 through the AV interface unit 606. In this way, the error indication is displayed (Step S215).

The above is the description on the arbitration processing in the client that has received the status response R12.

Next, a processing performed based on the valid flag in the arbitration table will be described.

Figure 17:
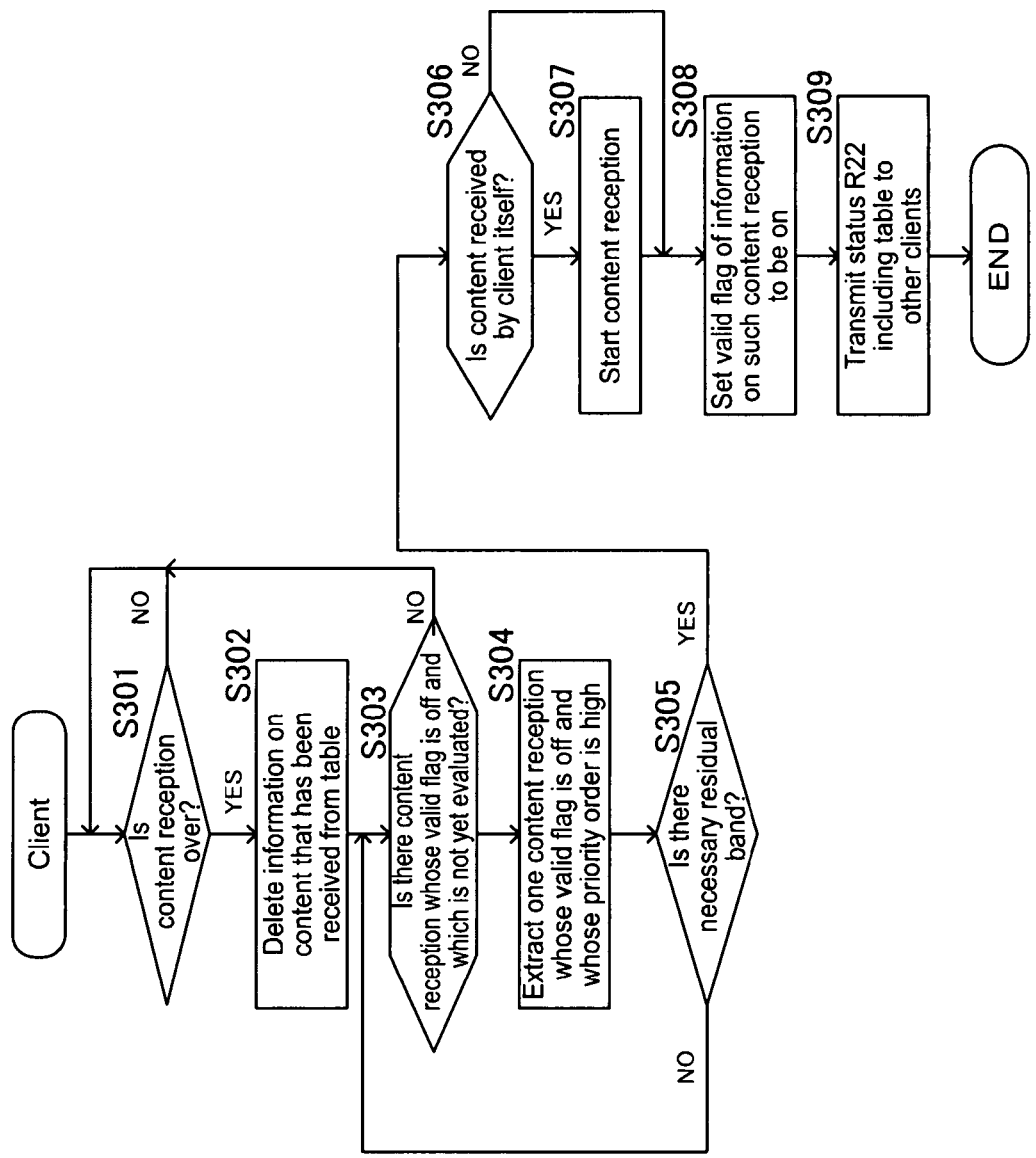
FIG. 17 is a flowchart showing an operation by the arbitration processing unit based on a valid flag.

FIG. 17 is a flowchart showing an operation by the arbitration processing unit 39 based on the valid flag.

The flow shown in FIG. 17 is executed by all the clients 600 that are receiving the content. When the reception of one content is ended in the clients 600 (Step S301), the arbitration unit 52 deletes the information on the content from the arbitration table stored in the arbitration condition/arbitration table storage unit 40 of the client 600 itself (Step S302).

Next, the arbitration unit 52 searches the arbitration table stored in the arbitration condition/arbitration table storage unit 40 of the client 600 itself for entries of the content receptions, values of valid flags of which are off (Step S303). When the arbitration unit 52 finds out the entries of the content receptions, the values of the valid flags of which are off (YES in Step S303), the arbitration unit 52 takes out an entry of the highest-priority content reception from among the entries in accordance with the arbitration conditions (Step S304).

Subsequently, the arbitration unit 52 judges whether a residual band necessary for performing the content reception of the entry taken out from the arbitration table remains (Step S304). When it is judged that no necessary residual band remains, the process returns to Step S303. The arbitration unit 52 takes out an entry of the second-highest-priority content reception, the value of the valid flag of which is off, and performs the judgment of Step S304 in the same way. In a case where it is judged that the residual band is insufficient for all the entries, the values of the valid flags of which are off, registered in the arbitration table (NO in Step S303), the arbitration unit 52 gives up starting to receive a new content, and the process returns to Step S301. That is, the arbitration unit 52 waits until the preceding content reception in the client 600 itself is over.

In addition, in a case where it is judged in Step S304 that the residual band necessary for performing the content reception of the entry taken out form the arbitration table remains, the arbitration unit 52 judges whether the content reception is performed by the client 600 itself (Step S306). When it is judged that the content reception is performed by the client 600 itself, the arbitration unit 52 sends a notification (R15) to the content obtainment unit 31 to cause the content obtainment unit 31 to start the content reception. In accordance with the notification (R15), the content obtainment unit 31 starts the reception of the data D1 of the content in the client 600 itself (Step S307). Then, the arbitration unit 52 updates the value of the valid flag in the information on the content reception registered in the arbitration table to on (Step S308), and transmits, to the other clients 600, a status response R22 including the details D4 of the arbitration table updated (Step S309).

Subsequently, an operation of the client 600 that has received the status response R22 will be described.

Figure 18:
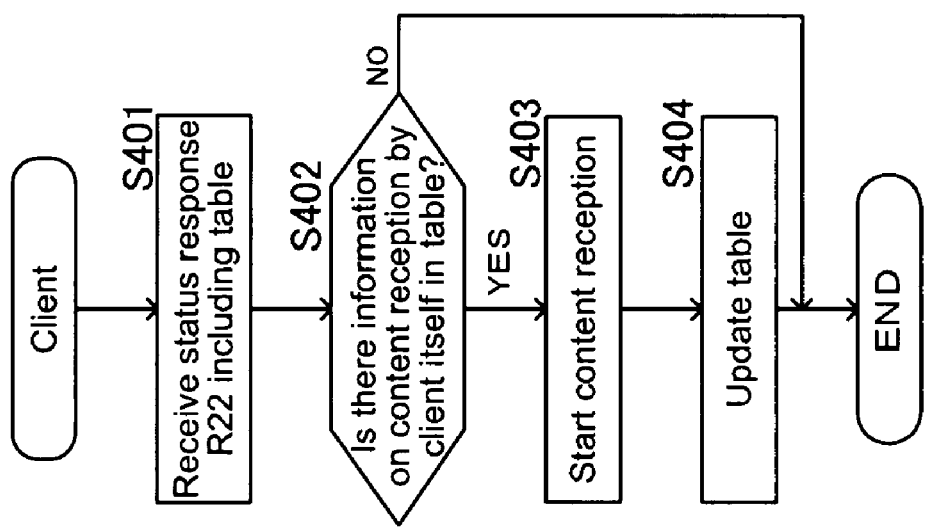
FIG. 18 is a flowchart showing an operation of a client that has received a status response.

FIG. 18 is a flowchart showing the operation of the client 600 that has received the status response R22.

Upon reception of the status response R22 (Step S401), the arbitration unit 52 of the client 600 compares the arbitration table included in the status response R22 with the arbitration table stored in the arbitration condition/arbitration table storage unit 40 of the client 600 itself. Based on the comparison, the arbitration unit 52 checks whether there is an entry of information on the content reception which is in a stopped state (in a standby state) and performed by the client 600 itself in the arbitration table included in the status response R22 (Step S402).

When the entry of the information on the content reception which is in the stopped state (in the standby state) and performed by the client 600 itself is found out from the arbitration table (YES in Step S402), the arbitration unit 52 performs the following processing. That is, the arbitration unit 52 sends the notification (R15) to the content obtainment unit 31 to cause the content obtainment unit 31 to start the content reception. In accordance with the notification (R15), the content obtainment unit 31 starts to receive the data D1 of the content in the client 600 itself (Step S403). Then, the arbitration unit 52 updates the data in the arbitration table stored in the arbitration condition/arbitration table storage unit 40 to the data of the arbitration table included in the status response R22 (Step S404). As a result, consistency of the arbitration tables among the clients 600 is ensured.

On the other hand, when no entry of the information on the content reception which is in the stopped state (in the standby state) and is performed by the client 600 itself is found from the arbitration table of the status response R22 in Step S402 (NO in Step S402), any operation is not performed, and the operation flow is ended.

As described above, according to this embodiment, the content reception in the stopped state (in the standby state) can be automatically restarted when the residual band for the content reception is generated.

Third Embodiment

Contents distributed via a network include contents with a time axis, such as a moving image (including sound) and music, and contents without the time axis, such as a program and a document. The contents without the time axis such as the program and the document are different from the contents with the time axis such as the moving image (including sound) and the music in that the contents without the time axis are required to be entirely obtained by a client.

For distributing the program, unicasting and multicasting are used. In a case of the unicasting, when the reception is stopped due to the lack of the band, the rest is restarted to be received after waiting until a free band is generated. In contrast, in a case of the multicasting, when the reception of the program is stopped, it is necessary to receive the program again from the beginning after waiting for the next broadcast time.

In view of the above, in the third embodiment, the following arbitration table is used.

FIG. 20 is a diagram showing a structure of the arbitration table. To the arbitration table, information items on kinds of contents and distribution methods are registered in addition to the elements of the arbitration table used in the second embodiment. The kinds of the contents include a moving image, music, a program, a document, and the like, one of which is registered as an entry in the arbitration table. The distribution methods include the unicasting and the multicasting, one of which is registered as an entry in the arbitration table.

Next, a description will be given on an arbitration processing in the content transmission/reception system 100 according to this embodiment.

Figure 21:
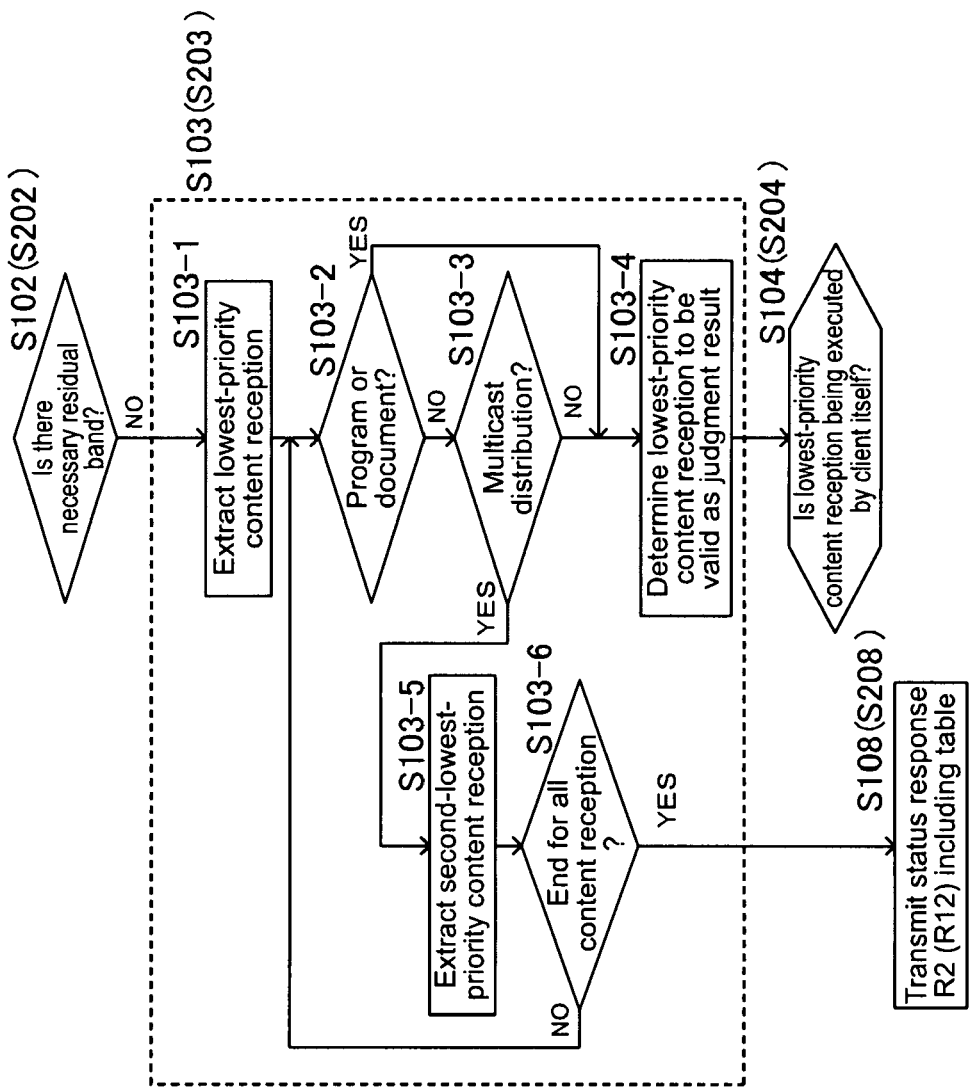
FIG. 21 is a flowchart showing a part of an arbitration processing by an arbitration processing unit according to the third embodiment.

FIG. 21 is a flowchart showing a part of the arbitration processing by the arbitration processing unit 39 in this embodiment. The flowchart is a modified version of the processes of Step S103 shown in FIG. 7 in the first embodiment and Step S203 shown in FIG. 16 in the second embodiment, in which the entry of the lowest-priority content reception in the arbitration table is determined.

In the case where it is judged that no residual band necessary for performing the content reception of the arbitration start request R1 remains, the arbitration unit 52 performs the following processing. The arbitration unit 52 reads the arbitration condition stored in the arbitration condition/arbitration table storage unit 40. The arbitration unit 52 extracts an entry of the lowest-priority content reception from the content receptions in execution registered in the arbitration table and the content reception of the arbitration start request R1 in accordance with the arbitration conditions (Step S103-1).

The arbitration unit 52 reads the kind of the content in the entry of the lowest-priority content reception extracted, and judges whether the kind of the content is the program or the document (Step S103-2). When the kind of the content is the program or the document, the arbitration unit 52 determines that the lowest-priority content reception extracted is valid as the judgment result (Step S103-4). After that, in Step S104 (Step S204), judgment is performed as to whether the lowest-priority content reception is performed by the client 600 itself.

On the other hand, in a case where the kind of the content is neither the program nor the document (for example, the moving image or the music), the arbitration unit 52 judges whether the distribution method in the entry of the lowest-priority content reception extracted is multicasting (Step S103-3). In a case where the distribution method is not the multicasting (i.e., unicasting), the arbitration unit 52 determines that the lowest-priority content reception extracted is valid as the judgment result (Step S103-4). After that, in Step S104 (Step S204), judgment is performed as to whether the lowest-priority content reception is performed by the client 600 itself.

In a case where the distribution method is multicasting, the arbitration unit 52 determines that the lowest-priority content reception extracted is invalid as the judgment result. Subsequently, in accordance with the arbitration conditions, the arbitration unit 52 extracts an entry of the second-lowest-priority content reception from the content receptions in execution registered in the arbitration table and the content reception of the arbitration start request R1 (Step S103-5). After that, the process returns to Step S103-2, the arbitration unit 52 judges whether the kind of the content is the program or the document, and thereafter the same processing is performed.

In a case where any valid content reception is not obtained and the above processing is completed with respect to all of the content receptions in execution registered in the arbitration table and the content reception of the arbitration start request R1 (YES in Step S103-6), the status response R2 (R12) including the details of the current arbitration table is transmitted in Step S108 (Step S208).

The other operations by the arbitration unit 52 are the same as in the first and second embodiments.

As a result, it is possible to preferentially assign the band to the reception of the program and the document that are distributed by the multicasting, and it is also possible to prevent the band used for the reception of the program and the document distributed by the multicasting from being assigned to the reception of another content.

The functional structure equipped to the clients 600 in this embodiment can be structured as a program such as an application program for causing the computer to operate. The program can be distributed by being recorded on a computer-readable recording medium.

It should be noted that the present invention is not limited to the above embodiments and can be variously modified within the range of the technical idea of the present invention.

What is claimed is:

1. A content reception apparatus capable of receiving a content distributed from a server apparatus via a first network and a second network, the content reception apparatus including a plurality of content reception apparatuses capable of being connected to the second network that is local and connected to the first network, the server apparatus being capable of distributing a content and capable of being connected to the first network, the content reception apparatus comprising:

an arbitration condition storage unit to store an arbitration condition for an arbitration for using a band of the second network by the plurality of content reception apparatuses;

an arbitration table storage unit to store an arbitration table in which information on a reception of the content in execution by the plurality of content reception apparatuses connected to the second network is registered;

an input unit with which a content reception request including identification information of a content to be received and a priority of the content is input by a user;

an arbitration start request transmission unit to generate an arbitration start request including at least the identification information of the content and the priority of the content that are included in the content reception request input with the input unit, a use band used when the content is received, and apparatus identification information predetermined for the content reception apparatus itself, and transmit the arbitration start request to other content reception apparatuses via the second network; and an arbitration unit to compare, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network to judge whether a residual band necessary for executing the content reception of the arbitration start request remains, additionally register, when the necessary residual band remains, information items included in the arbitration start request in the arbitration table to transmit a response including details of the arbitration table updated to the content reception apparatus as an arbitration start request source, determine, when the necessary residual band is insufficient, a lowest-priority content reception in the content receptions in execution that are registered in the arbitration table and the content reception of the arbitration start request in accordance with the arbitration condition stored in the arbitration condition storage unit, stop, when the lowest-priority content reception is executed by the content reception apparatus itself, the content reception to delete information on the content reception stopped from the arbitration table and transmit a response including details of the arbitration table updated to the content reception apparatus as the arbitration start request source, transmit, when the lowest-priority content reception is executed by the content reception apparatus as the arbitration start request source, a response including details of the arbitration table at a time when the arbitration start request is received to the content reception apparatus as the arbitration start request source, delete, when the lowest-priority content reception is executed by a content reception apparatus other than the content reception apparatus itself and the content reception apparatus as the arbitration start request source, the information on the content reception from the arbitration table to transmit a response including details of the arbitration table updated to the content reception apparatus as the arbitration start request source, and judge, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

2. The content reception apparatus, according to claim 1, wherein the arbitration unit causes the user to set the arbitration condition and a priority order of an apparatus of the content reception apparatus itself, and transmits the arbitration condition and the priority order of the apparatus that are set to the other content reception apparatuses via the second network to share and store the arbitration condition and the priority order of the apparatus among the plurality of content reception apparatuses connected to the second network.

3. The content reception apparatus, according to claim 2, wherein the arbitration unit causes the user to set, as the arbitration condition, at least one of preferentially executing a content reception for the apparatus having higher priority, preferentially executing a content reception of the content having higher priority, and preferentially executing a content reception in which the use band is smaller.

4. A content reception apparatus capable of receiving a content distributed from a server apparatus via a first network and a second network, the content reception apparatus including a plurality of content reception apparatuses capable of being connected to the second network that is local and connected to the first network, the server apparatus being capable of distributing a content and capable of being connected to the first network, the content reception apparatus comprising:

an arbitration condition storage unit to store an arbitration condition for an arbitration for using a band of the second network by the plurality of content reception apparatuses;

an arbitration table storage unit to store an arbitration table in which information on a reception of the content in execution by the plurality of content reception apparatuses connected to the second network and flag information that indicates whether the information on the content reception is valid are registered;

an input unit with which a content reception request including identification information of a content to be received and a priority of the content is input by a user;

an arbitration start request transmission unit to generate an arbitration start request including at least the identification information of the content and the priority of the content that are included in the content reception request input with the input unit, a use band used when the content is received, and apparatus identification information predetermined for the content reception apparatus itself, and transmit the arbitration start request to other content reception apparatuses via the second network; and an arbitration unit to compare, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network to judge whether a residual band necessary for executing the content reception of the arbitration start request remains, additionally register, when the necessary residual band remains, information items included in the arbitration start request in the arbitration table to transmit a response including details of the arbitration table updated to the content reception apparatus as an arbitration start request source, determine, when the necessary residual band is insufficient, a lowest-priority content reception in the content receptions in execution that are registered in the arbitration table and the content reception of the arbitration start request in accordance with the arbitration condition stored in the arbitration condition storage unit, stop, when the lowest-priority content reception is executed by the content reception apparatus itself, the content reception to set the flag information that indicates the information on the content reception stopped that is registered in the arbitration table is invalid and transmit a response including details of the arbitration table updated to the content reception apparatus as the arbitration start request source, transmit, when the lowest-priority content reception is executed by the content reception apparatus as the arbitration start request source, a response including details of the arbitration table at a time when the arbitration start request is received to the content reception apparatus as the arbitration start request source, set, when the lowest-priority content reception is executed by a content reception apparatus other than the content reception apparatus itself and the content reception apparatus as the arbitration start request source, the flag information that indicates the information on the content reception in the arbitration table is invalid to transmit a response including details of the arbitration table updated to the content reception apparatus as the arbitration start request source, and judge, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

5. The content reception apparatus, according to claim 4, wherein the arbitration unit deletes, upon completion of a reception of one content, information on the content from the arbitration table of the arbitration table storage unit, determines a highest-priority content reception from among content receptions without valid flag information in accordance with the arbitration condition, judges whether a residual band necessary for executing the content reception remains, updates, when the necessary residual band remains, the arbitration table so that the flag information is set to be valid with respect to the content reception to transmit a response including details of the arbitration table updated to other content reception apparatuses, compares, upon reception of the response from the other content reception apparatuses, details of the arbitration table included in the response with those of the arbitration table of the arbitration table storage unit, starts, when information on the content reception in a stopped state which is executed by the content reception apparatus itself is included in the details of the arbitration table included in the response, the content reception, and updates the details of the arbitration table of the arbitration table storage unit to the details of the arbitration table included in the response.

6. The content reception apparatus, according to claim 5, wherein, when the highest-priority content reception determined in accordance with the arbitration condition is executed by the content reception apparatus itself and the residual band necessary for executing the content reception remains, the arbitration unit performs control so that the content reception is started.

7. A content reception method, by which a plurality of content reception apparatuses receive a content distributed from a server apparatus via a first network and a second network, the plurality of content reception apparatuses being connected to the second network that is local and connected to the first network, the server apparatus being capable of distributing a content and being connected to the first network, the plurality of content reception apparatuses each including an arbitration condition storage unit, an arbitration table storage unit, and an arbitration unit, the arbitration condition storage unit storing an arbitration condition for an arbitration for using a band of the second network among the plurality of content reception apparatuses, the arbitration table storage unit storing an arbitration table in which information on a reception of the content in execution by the plurality of content reception apparatuses connected to the second network is registered, the content reception method comprising:

causing a user to input a content reception request including identification information of a content to be received and a priority of the content;

generating, by the arbitration unit, an arbitration start request including at least the identification information of the content and the priority of the content that are included in the content reception request input, a use band used when the content is received, and apparatus identification information predetermined for the content reception apparatus itself, to transmit the arbitration start request to other content reception apparatuses via the second network;

comparing, by the arbitration unit, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network, to judge whether a residual band necessary for executing the content reception of the arbitration start request remains;

additionally registering, by the arbitration unit, when the necessary residual band remains, information items included in the arbitration start request in the arbitration table, to transmit a response including details of the arbitration table updated to the content reception apparatus as an arbitration start request source;

determining, by the arbitration unit, when the necessary residual band is insufficient, a lowest-priority content reception in the content receptions in execution that are registered in the arbitration table and the content reception of the arbitration start request in accordance with the arbitration condition stored in the arbitration condition storage unit;

stopping, by the arbitration unit, when the lowest-priority content reception is executed by the content reception apparatus itself, the content reception, to delete information on the content reception stopped from the arbitration table and transmit a response including details of the arbitration table updated to the content reception apparatus as the arbitration start request source;

transmitting, by the arbitration unit, when the lowest-priority content reception is executed by the content reception apparatus as the arbitration start request source, a response including details of the arbitration table at a time when the arbitration start request is received to the content reception apparatus as the arbitration start request source;

deleting, by the arbitration unit, when the lowest-priority content reception is executed by a content reception apparatus other than the content reception apparatus itself and the content reception apparatus as the arbitration start request source, the information on the content reception from the arbitration table, to transmit a response including details of the arbitration table updated to the content reception apparatus as the arbitration start request source; and judging, by the arbitration unit, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

8. A content reception method, by which a plurality of content reception apparatuses receive a content distributed from a server apparatus via a first network and a second network, the plurality of content reception apparatuses being connected to the second network that is local and connected to the first network, the server apparatus being capable of distributing a content and being connected to the first network, the plurality of content reception apparatuses each including an arbitration condition storage unit, an arbitration table storage unit, and an arbitration unit, the arbitration condition storage unit storing an arbitration condition for an arbitration for using a band of the second network among the plurality of content reception apparatuses, the arbitration table storage unit storing an arbitration table in which information on a reception of the content in execution by the plurality of content reception apparatuses connected to the second network is registered, the content reception method comprising:

causing a user to input a content reception request including identification information of a content to be received and a priority of the content;

generating, by the arbitration unit, an arbitration start request including at least the identification information of the content and the priority of the content that are included in the content reception request input, a use band used when the content is received, and apparatus identification information predetermined for the content reception apparatus itself, to transmit the arbitration start request to other content reception apparatuses via the second network;

comparing, by the arbitration unit, upon reception of the arbitration start request from the other content reception apparatuses, a sum of use bands for content receptions in execution that are registered in the arbitration table of the arbitration table storage unit and a use band for a content reception of the arbitration start request with an upper limit of the band of the second network, to judge whether a residual band necessary for executing the content reception of the arbitration start request remains;

additionally registering, by the arbitration unit, when the necessary residual band remains, information items included in the arbitration start request in the arbitration table, to transmit a response including details of the arbitration table updated to the content reception apparatus as an arbitration start request source;

determining, by the arbitration unit, when the necessary residual band is insufficient, a lowest-priority content reception in the content receptions in execution that are registered in the arbitration table and the content reception of the arbitration start request in accordance with the arbitration condition stored in the arbitration condition storage unit;

stopping, by the arbitration unit, when the lowest-priority content reception is executed by the content reception apparatus itself, the content reception, to set flag information that indicates the information on the content reception stopped that is registered in the arbitration table is invalid and transmit a response including details of the arbitration table updated to the content reception apparatus as the arbitration start request source;

transmitting, by the arbitration unit, when the lowest-priority content reception is executed by the content reception apparatus as the arbitration start request source, a response including details of the arbitration table at a time when the arbitration start request is received to the content reception apparatus as the arbitration start request source;

setting, by the arbitration unit, when the lowest-priority content reception is executed by a content reception apparatus other than the content reception apparatus itself and the content reception apparatus as the arbitration start request source, the flag information that indicates the information on the content reception in the arbitration table is invalid, to transmit a response including details of the arbitration table updated to the content reception apparatus as the arbitration start request source; and judging, by the arbitration unit, upon reception of the response from the content reception apparatus as a transmission destination of the arbitration start request, whether the information on the content reception of the arbitration start request is included in the details of the arbitration table included in the response, to start, when the information is included, the content reception in accordance with the content reception request input with the input unit for the content reception request and update the arbitration table of the arbitration table storage unit to the arbitration table included in the response.

9. A content reception method, by which a plurality of content reception apparatuses receive a content distributed from a server apparatus via a first network and a second network, the plurality of content reception apparatuses being connected to the second network that is local and connected to the first network, the server apparatus being capable of distributing a content and being connected to the first network, the content reception method comprising:

generating an arbitration start request including at least identification information of the content and a priority of the content that are included in a content reception request input, a use band used when the content is received, and apparatus identification information predetermined for the content reception apparatus itself, to transmit the arbitration start request to other content reception apparatuses via the second network;

comparing, upon reception of the arbitration start request from the other content reception apparatuses, a sum of use bands for content receptions in execution that are registered in an arbitration table and a use band for a content reception of the arbitration start request with an upper limit of a band of the second network to judge whether a residual band necessary for executing the content reception of the arbitration start request remains;

determining, when the necessary residual band is insufficient, a lowest-priority content reception in the content receptions in execution that are registered in the arbitration table and in the arbitration start request; and performing a first predetermined process when the content reception apparatus itself executes the lowest-priority content reception or a second predetermined process when one of the other content reception apparatuses executes the lowest-priority content reception, in which the first predetermined process is different from the second predetermined process.

* * * * *